United States Patent
Dinan

(10) Patent No.: US 10,499,382 B2
(45) Date of Patent: Dec. 3, 2019

(54) CONTROL CHANNEL CONFIGURATION IN PARTIAL AND FULL SUBFRAMES

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/295,977

(22) Filed: Oct. 17, 2016

(65) Prior Publication Data

US 2017/0111888 A1 Apr. 20, 2017

Related U.S. Application Data

(60) Provisional application No. 62/243,028, filed on Oct. 17, 2015.

(51) Int. Cl.
*H04W 72/04* (2009.01)
*H04L 5/00* (2006.01)

(52) U.S. Cl.
CPC .......... *H04W 72/042* (2013.01); *H04L 5/001* (2013.01); *H04L 5/0053* (2013.01); *H04W 72/044* (2013.01)

(58) Field of Classification Search
None
See application file for complete search history.

(56) References Cited

U.S. PATENT DOCUMENTS

| | | |
|---|---|---|
| 9,319,194 B2 | 4/2016 | Dinan |
| 9,736,795 B2 | 8/2017 | Dinan |
| 9,781,712 B2 | 10/2017 | Nory et al. |
| 9,872,336 B2 | 1/2018 | Dinan |
| 9,894,681 B2 | 2/2018 | Dinan |
| 9,900,836 B2 | 2/2018 | Axen et al. |
| 2011/0134774 A1 | 6/2011 | Pelletier et al. |
| 2011/0243016 A1 | 10/2011 | Zhang et al. |
| 2011/0268029 A1 | 11/2011 | Tseng |
| 2012/0069802 A1 | 3/2012 | Chen et al. |

(Continued)

FOREIGN PATENT DOCUMENTS

| | | |
|---|---|---|
| WO | 2013/179590 A1 | 12/2013 |
| WO | 2016157797 A1 | 10/2016 |
| WO | 2017030487 A1 | 2/2017 |

OTHER PUBLICATIONS

R1-155103, 3GPP TSG RAN WG1 Meeting #82bis, Malmo, Sweden, Oct. 5-9, 2015, Source: Huawei, HiSilicon, Title: Candidate starting/ending positions of partial subframe and corresponding indication for LAA.*

(Continued)

*Primary Examiner* — George C Atkins
(74) *Attorney, Agent, or Firm* — Banner & Witcoff, Ltd.

(57) ABSTRACT

A wireless device receives at least one radio resource control (RRC) message comprising a field indicating a starting symbol for an enhanced physical downlink control channel (ePDCCH). The wireless device receives ePDCCH signal in a subframe. The ePDCCH starts from the starting symbol when the subframe is a full subframe. The ePDCCH starts from the starting symbol plus an offset value when the subframe is a partial subframe.

28 Claims, 11 Drawing Sheets

(56) References Cited

U.S. PATENT DOCUMENTS

| | | |
|---|---|---|
| 2012/0082088 A1 | 4/2012 | Dalsgaard et al. |
| 2012/0182879 A1 | 7/2012 | Tamura et al. |
| 2012/0213163 A1 | 8/2012 | Lee et al. |
| 2012/0257570 A1 | 10/2012 | Jang et al. |
| 2012/0329461 A1 | 12/2012 | Teyeb et al. |
| 2013/0010619 A1 | 1/2013 | Fong et al. |
| 2013/0028198 A1 | 1/2013 | Yamada |
| 2013/0094392 A1 | 4/2013 | Kim et al. |
| 2013/0114398 A1 | 5/2013 | Wang |
| 2013/0188612 A1 | 7/2013 | Dinan |
| 2013/0195057 A1* | 8/2013 | Dinan ............... H04W 36/0072 370/329 |
| 2013/0215848 A1 | 8/2013 | Kato et al. |
| 2013/0235768 A1 | 9/2013 | Earnshaw et al. |
| 2013/0272233 A1 | 10/2013 | Dinan |
| 2013/0279433 A1 | 10/2013 | Dinan |
| 2013/0301446 A1 | 11/2013 | Chen et al. |
| 2014/0016593 A1 | 1/2014 | Park et al. |
| 2014/0036664 A1 | 2/2014 | Han et al. |
| 2014/0050113 A1 | 2/2014 | Rosa et al. |
| 2014/0056220 A1 | 2/2014 | Poitau et al. |
| 2014/0161117 A1 | 6/2014 | Sebire et al. |
| 2014/0269595 A1 | 9/2014 | Lee et al. |
| 2015/0003418 A1 | 1/2015 | Rosa et al. |
| 2015/0016350 A1 | 1/2015 | Moulsley et al. |
| 2015/0036614 A1 | 2/2015 | Lee et al. |
| 2015/0078286 A1 | 3/2015 | Kim et al. |
| 2015/0087315 A1 | 3/2015 | Lu et al. |
| 2015/0087316 A1 | 3/2015 | Bostrom et al. |
| 2015/0117342 A1 | 4/2015 | Loehr et al. |
| 2015/0124670 A1 | 5/2015 | Park |
| 2015/0146588 A1 | 5/2015 | Park |
| 2015/0181453 A1 | 6/2015 | Chen et al. |
| 2015/0181590 A1 | 6/2015 | Park |
| 2015/0189574 A1 | 7/2015 | Ng et al. |
| 2015/0215079 A1 | 7/2015 | Park |
| 2015/0215977 A1 | 7/2015 | Yamazaki |
| 2015/0223213 A1 | 8/2015 | Moon et al. |
| 2015/0245219 A1 | 8/2015 | Wei |
| 2015/0245307 A1 | 8/2015 | Chen et al. |
| 2015/0256303 A1 | 9/2015 | Belghoul et al. |
| 2015/0271811 A1 | 9/2015 | Kim et al. |
| 2015/0289179 A1 | 10/2015 | Liu et al. |
| 2015/0312930 A1 | 10/2015 | Han et al. |
| 2016/0044617 A1 | 2/2016 | Vajapeyam et al. |
| 2016/0044655 A1 | 2/2016 | Park et al. |
| 2016/0044737 A1 | 2/2016 | Kwon |
| 2016/0066284 A1 | 3/2016 | Kwon et al. |
| 2016/0095114 A1 | 3/2016 | Kim et al. |
| 2016/0135148 A1 | 5/2016 | Novlan et al. |
| 2016/0143014 A1 | 5/2016 | Mukherjee et al. |
| 2016/0150485 A1 | 5/2016 | Yi et al. |
| 2016/0174247 A1* | 6/2016 | Ruiz Delgado ....... H04W 48/16 370/329 |
| 2016/0192388 A1 | 6/2016 | Ekpenyong et al. |
| 2016/0205681 A1 | 7/2016 | Kim et al. |
| 2016/0227417 A1 | 8/2016 | Yerramalli et al. |
| 2016/0227428 A1 | 8/2016 | Novlan et al. |
| 2016/0227541 A1 | 8/2016 | Damnjanovic et al. |
| 2016/0242153 A1 | 8/2016 | Chen et al. |
| 2016/0262118 A1 | 9/2016 | Kim et al. |
| 2016/0277987 A1 | 9/2016 | Chen et al. |
| 2016/0278050 A1 | 9/2016 | Nory et al. |
| 2016/0285716 A1 | 9/2016 | Pelletier et al. |
| 2016/0302177 A1 | 10/2016 | Kwon et al. |
| 2016/0302228 A1 | 10/2016 | Kazmi et al. |
| 2016/0337112 A1 | 11/2016 | Suzuki et al. |
| 2016/0365959 A1 | 12/2016 | Dinan |
| 2016/0366675 A1 | 12/2016 | Dinan |
| 2016/0366681 A1 | 12/2016 | Dinan |
| 2016/0374082 A1 | 12/2016 | Nguyen et al. |
| 2016/0381681 A1 | 12/2016 | Nogami et al. |
| 2017/0013469 A1 | 1/2017 | Larsson et al. |
| 2017/0041059 A1 | 2/2017 | Yi et al. |
| 2017/0041805 A1 | 2/2017 | Chandrasekhar et al. |
| 2017/0041905 A1 | 2/2017 | Chen et al. |
| 2017/0048718 A1* | 2/2017 | Kim .................. H04W 56/0005 |
| 2017/0048880 A1 | 2/2017 | Anderson et al. |
| 2017/0055242 A1 | 2/2017 | Kusashima et al. |
| 2017/0055263 A1 | 2/2017 | Tomeba et al. |
| 2017/0055293 A1 | 2/2017 | Yang et al. |
| 2017/0086172 A1 | 3/2017 | Dinan |
| 2017/0086194 A1 | 3/2017 | Tavildar et al. |
| 2017/0094681 A1 | 3/2017 | Takeda et al. |
| 2017/0099633 A1 | 4/2017 | Axen et al. |
| 2017/0117997 A1 | 4/2017 | Park et al. |
| 2017/0118658 A1 | 4/2017 | Hwang et al. |
| 2017/0127414 A1* | 5/2017 | Yi ...................... H04L 27/2611 |
| 2017/0135023 A1 | 5/2017 | Jung et al. |
| 2017/0135127 A1 | 5/2017 | Nogami et al. |
| 2017/0164361 A1 | 6/2017 | Park |
| 2017/0181143 A1 | 6/2017 | Kim et al. |
| 2017/0195099 A1 | 7/2017 | Kahtava et al. |
| 2017/0196020 A1 | 7/2017 | Mukherjee et al. |
| 2017/0201308 A1 | 7/2017 | Park et al. |
| 2017/0201985 A1 | 7/2017 | Wang |
| 2017/0202022 A1 | 7/2017 | Chendamarai Kannan et al. |
| 2017/0251454 A1 | 8/2017 | Yang et al. |
| 2017/0265225 A1 | 9/2017 | Takeda et al. |
| 2017/0280430 A1 | 9/2017 | Yin et al. |
| 2017/0311206 A1 | 10/2017 | Ryoo et al. |
| 2017/0311322 A1* | 10/2017 | Kim ..................... H04W 72/04 |
| 2017/0339580 A1 | 11/2017 | Martin et al. |
| 2017/0339607 A1 | 11/2017 | Lu et al. |
| 2017/0339717 A1 | 11/2017 | Futaki |
| 2017/0339721 A1 | 11/2017 | Mukherjee et al. |
| 2017/0353912 A1 | 12/2017 | Einhaus et al. |
| 2017/0353965 A1 | 12/2017 | Zhang |
| 2017/0373914 A1 | 12/2017 | Harada et al. |
| 2018/0007708 A1 | 1/2018 | Ke et al. |
| 2018/0014291 A1 | 1/2018 | Takeda et al. |
| 2018/0041989 A1 | 2/2018 | Shimezawa et al. |
| 2018/0048498 A1 | 2/2018 | Stern-Berkowitz et al. |
| 2018/0049221 A1 | 2/2018 | Park et al. |
| 2018/0049241 A1 | 2/2018 | Heo et al. |
| 2018/0077581 A1 | 3/2018 | Ahn et al. |
| 2018/0077688 A1 | 3/2018 | Yi et al. |
| 2018/0110045 A1* | 4/2018 | You .......................... H04J 11/00 |
| 2018/0139767 A1 | 5/2018 | Lee et al. |
| 2018/0295609 A1* | 10/2018 | Shimezawa ........... H04W 16/14 |

OTHER PUBLICATIONS

3GPP TR 36.889 V1.0.1 (Jun. 2015), Technical Report, 3rd Generation Partnership Project; Technical Specification Radio Access Network; Study on Licensed-Assisted Access to Unlicensed Spectrum; (Release 13).

3GPP TS 36.213 V12.5.0 (Mar. 2015), Technical Specification, 3rd Generation Partnership Project; Technical Specification Group Radio Access Network; Evolved Universal Terrestrial Radio Access (E-UTRA);Physical layer procedures (Release 12).

3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.

3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.

R1-153786, 3GPP TSG RAN WG1 Meeting #82, Beijing, China, Aug. 24-28, 2015, Source: Huawei, HiSilicon, Title: Indication of DL transmission burst duration for LAA.

R1-153787, 3GPP TSG RAN WG1 Meeting #82, Beijing, China, Aug. 24-28, 2015, Source: Huawei, HiSilicon, Title: Candidate starting positions of partial subframe and corresponding RS pattern for LAA.

R1-154150, 3GPP TSG RAN WG1 #82, Beijing, China, Aug. 24-28, 2015, Source: Samsung, Title: Partial subframe for LAA.

(56) References Cited

OTHER PUBLICATIONS

R1-155316, 3GPP TSG RAN WG1 Meeting #82bis, Malmö, Sweden, Oct. 5-9, 2015, Source: Intel Corporation, Title:DL sub-frame structure and (e)PDCCH.
R1-155389, 3GPP TSG RAN WG1 meeting #82bis, Malmö, Sweden, Oct. 5-9, 2015, Source: LG Electronics, Title:DL transmission structure in LAA.
R1-155468, 3GPP TSG RAN WG1 #82bis, Malmö, Sweden, Oct. 5-9, 2015, Source: Samsung, Title: LAA transmission burst structure and signaling.
R1-155474, 3GPP TSG RAN WG1 #82bis, Malmo, Sweden, Oct. 5-9, 2015, Source: Samsung, Title: Partial subframe LAA.
R1-155529, 3GPP TSG-RAN WG1 Meeting #82bis, Malmö, Sweden, Oct. 5-9, 2015, Source: InterDigital Communications, Title: On LAA scheduling.
R1-155531, 3GPP TSG RAN WG1 Meeting #82bis, Malmö, Sweden, Oct. 5-9, 2015, Source: Kyocera, Title: DL Transmission Design for partial subframe.
R1-155569, 3GPP TSG RAN WG1 Meeting #82bis, Malmö, Sweden, Oct. 5-9, 2015, Source: Sharp, Title: Subframe structure for LAA discontinuous transmission.
R1-155570, 3GPP TSG RAN WG1 Meeting #82bis, Malmö, Sweden, Oct. 5-9, 2015, Source: Sharp, Title: Scheduling methods for LAA SCell.
R1-155629, 3GPP TSG RAN WG1 Meeting #82bis, Malmo, Sweden, Oct. 5-9, 2015, Source: Alcatel-Lucent, Alcatel-Lucent Shanghai Bell, Title: PDSCH and DCI Transmissions in LAA.
R1-155781, 3GPP TSG RAN WG1#82bis, Oct. 5-9, 2015, Malmo, Sweden, Source: Motorola Mobility, Title: PDSCH Transmission options for LAA.
R1-155902, 3GPP TSG RAN WG1 Meeting #82bis, Malmö, Sweden, Oct. 5-9, 2015, Source: NTT DOCOMO, INC., Title: Discussion on discontinuous transmission and scheduling design for LAA DL.
R1-156043, 3GPP TSG RAN WG1 Meeting #82bis, Malmö, Sweden, Oct. 5-9, 2015, Source: Ericsson, Title: On Dynamic DL/UL Scheduling.
R1-156047, 3GPP TSG RAN WG1 Meeting #82bis, Malmo, Sweden, Oct. 5-9, 2015, Source: Ericsson, Title: On Support of Multiple DL Data Transmission Starting Points.
3GPP TSG-RAN WG1 #80 R1-150086, Athens, Greece, Feb. 9-13, 2015, Source: Intel Corporation, Title: Discussion on CA enhancement for release 13.
3GPP TSG-RAN WG1 #80 R1-150537, Athens, Greece, Feb. 9-13, 2015, Agenda Item: 7.2.2.2.1, Source: InterDigital Communications, Title: Enabling LTE carrier aggregation of up to 32 component carriers.
3GPP TSG-RAN WG1 Meeting #80 R1-150454, Athens, Greece, Feb. 9-13, 2015, Agenda item: 7.2.2.2.3, Source: Nokia Networks, Nokia Corporation, Title: PUCCH Enhancements for Carrier Aggregation Enhancement Beyond 5 Carriers.
3GPP TSG-RAN WG1 Meeting #80 R1-150455, Athens, Greece, Feb. 9-13, 2015, Agenda item: 7.2.2.2.3, Source: Nokia Networks, Nokia Corporation, Title: CSI reporting for Carrier Aggregation Enhancement Beyond 5 Carriers.
3GPP TSG-RAN WG1#80 R1-150324, Athens, Greece, Feb. 9-13, 2015, Source: Ericsson, Title: UL control signaling enhancements for up to 32 CCs.
3GPP TSG-RAN WG2 Meeting#89 R2-150134, Feb. 9-13, 2015, Athens, Greece, Source: Institute for Information Industry (III), Title: Partition UGI feedback.
3GPP TSG RAN WG2 #89 bis R2-151304, Apr. 20 to May 24, 2015, Bratislava, Slovakia, Source: ITRI, Title: Discussion on SR on PUCCH SCell.
3GPP TSG RAN WG2 #89bis R2-151637, Apr. 20 to 24, 2015, Bratislava, Slovakia, Source: Samsung, Title: SR support for CA enhancements.
3GPP TSG RAN WG2 #90 R2-152712, May 25 to 29, 2015, Fukuoka, Japan, Source: Samsung, Title: How to support SR in PUCCH SCell.

3GPP TSG RAN WG2 Meeting #89b R2-151430, Bratislava, Slovakia, Apr. 20-24, 2015, Source: NEC, Title: SR on PUCCH SCell.
3GPP TSG RAN WG2 Meeting #89bis R2-151104, Bratislava, Slovakia, Apr. 20-24, 2015, Source: Intel Corporation, Title: Control plane aspects of support PUCCH on SCell.
3GPP TSG RAN WG2 Meeting #89bis R2-151342, Bratislava, Slovakia, Apr. 20-24, 2015, Source: CATT, Title: D-SR on PUCCH SCell.
3GPP TSG RAN WG2 Meeting #90 R2-152277, Fukuoka, Japan, May 25-29, 2015, Source: CATT, Title: D-SR on PUCCH SCell.
3GPP TSG RAN WG2 Meeting #90 R2-152512, Fukuoka, Japan, May 25-29, 2015, Source: NEC, Title: Potential issues of SR on PUCCH SCell.
3GPP TSG RAN2 Meeting #90 R2-152524, Fukuoka, Japan, May 25-29, 2015, Source: NEC, Title: Overlapping of D-SR resources.
3GPP TSG-RAN WG2 #89bis R2-151495, Bratislava, Slovakia, Apr. 20-24, 2015, Source: HTC, Title: PUCCH SCell management.
3GPP TSG-RAN WG2 #89bis Tdoc R2-151488, Bratislava, Slovakia, Apr. 20-24, 2015, Source: Ericsson, Title: SR on PUCCH SCell.
3GPP TSG-RAN WG2 #90 R2-152418, Fukouka, Japan, May 25-29, 2015, Source: HTC, Title: Managing PUCCH resources on a deactivated PUCCH SCell.
3GPP TSG-RAN WG2 #90 Tdoc R2-152530, Fukuoka, Japan, May 25-29, 2015, Source: Ericsson, Title: SR on PUCCH SCell.
3GPP TSG-RAN WG2 Meeting #89bis R2-151211, Bratislava, Slovakia, Apr. 20-24, 2015, Source: Nokia Networks, Title: SR on Scell.
3GPP TSG-RAN WG2 Meeting #89bis R2-151324, Bratislava, Slovakia, Apr. 20-24, 2015, Source: Huawei, HiSilicon, Title: Leftover issues for PUCCH on SCell.
3GPP TSG-RAN WG2 Meeting #89bis R2-151469, Bratislava, Slovakia, Apr. 20-24, 2015, Source: Alcatel-Lucent Shanghai Bell, Alcatel-Lucent, Title: SR transmissions on SCell PUCCH.
3GPP TSG-RAN WG2 Meeting #90 R2-152273, Fukuoka, Japan, May 25-29, 2015, Source: Huawei, HiSilicon, Title: Issues for SR on PUCCH Scell.
3GPP TSG-RAN WG2 Meeting #90 R2-152302, Fukuoka, Japan, May 25-29, 2015, Source: Nokia Networks, Title: SR on PUCCH SCell.
3GPP TSG-RAN WG2 Meeting #90 R2-152310, Fukuoka, Japan, May 25-29, 2015, Source: Nokia Networks, Title: PUCCH SCell pre-activation.
3GPP TSG-RAN WG2 Meeting #90 R2-152366, Fukuoka, Japan, May 25-29, 2015, Source: LG Electronics Inc., Title: SR for CA enhancement.
3GPP TSG-RAN WG2 Meeting #90 R2-152742, Fukuoka, Japan, May 25-29, 2015, Source: Qualcomm Incorporated, Title: Dual SR Procedures.
3GPP TSG-RAN2 #89bis Meeting R2-151252, Bratislava, Slovakia, Apr. 20-24, 2015, Source: MediaTek Inc., Title: Remaining issues for PUCCH on SCell.
3GPP TSG-RAN2 #90 Meeting R2-152138, Fukuoka, Japan, May 25-29, 2015, Source: MediaTek Inc., Title: Remaining UP issues for PUCCH on SCell.
3GPP TSG RAN WG1 Meeting #80 R1-150067, Athens, Greece, Feb. 9-13, 2015, Source: Huawei, HiSilicon, Title: Support of PUCCH on SCell based on dual connectivity mechanism.
3GPP TSG RAN WG1 Meeting #83 R1-157531, Anaheim, USA, Nov. 16-20, 2015, Source: Ericsson, Title: On Energy Detection Threshold for LAA.
3GPP TS 36.211 V13.0.0 (Dec. 2015), Technical Specification, 3rd Generation Partnership Project; Technical Specification Group Radio Access Network; Evolved Universal Terrestrial Radio Access (E-UTRA); Physical channels and modulation (Release 13).
3GPP TS 36.212 V13.0.0 (Dec. 2015), Technical Specification, 3rd Generation Partnership Project; Technical Specification Group Radio Access Network; Evolved Universal Terrestrial Radio Access (E-UTRA);Multiplexing and channel coding, (Release 13).
3GPP TS 36.213 V13.0.1 (Jan. 2016), Release 13, Technical Specification (TS).

(56) References Cited

OTHER PUBLICATIONS

3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network, (E-UTRAN); Overall description; Stage 2 (Release 13).
3GPP TS 36.321 V13.0.0 (Dec. 2015), Technical Specification, 3rd Generation Partnership Project; Technical Specification Group Radio Access Network; Evolved Universal Terrestrial Radio Access (E-UTRA);Medium Access Control (MAC) protocol specification, (Release 13).
3GPP TS 36.331 V13.0.0 (Dec. 2015), Technical Specification, 3rd Generation Partnership Project; Technical Specification Group Radio Access Network; Evolved Universal Terrestrial Radio Access (E-UTRA);Radio Resource Control (RRC); Protocol specification (Release 13).
3GPP TSG RAN WG1 #82, R1-154139, Beijing, China, Aug. 24-28, 2015, Title: CCA threshold and transmission power for LAA.
3GPP TSG RAN WG1 #82bis R1-155460, Malmo, Sweden, Oct. 5-9, 2015, Source: Samsung, Title: LAA energy detection adaptation.
3GPP TSG RAN WG1 #82bis, R1-155721, Oct. 5-9, 2015, Malmo, Sweden, Agenda item: 7.2.3.1, Source: Qualcomm Incorporated Title: Adaptive ED threshold setting.
3GPP TSG RAN WG1 #82bis, R1-155722, Oct. 5-9, 2015, Malmo, Sweden, Agenda item: 7.2.3.1, Source: Qualcomm Incorporated Title: Remaining details of UL LBT operation.
3GPP TSG RAN WG1 #82bis, R1-155724, Oct. 5-9, 2015, Malmo, Sweden, Agenda item: 7.2.3.1, Source: Qualcomm Incorporated, Title: Multi-carrier LBT operation.
3GPP TSG RAN WG1 #83 R1-156489, Nov. 15-22, 2015, Anaheim, USA, Agenda item: 6.2.3.1, Source: Cisco Systems, Title: Views on Energy Detection Threshold Adaptation.
3GPP TSG RAN WG1 #83 R1-156490, Nov. 15-22, 2015, Anaheim, USA, Agenda item: 6.2.3.1, Source: Cisco Systems, Title: Views on Multi-Channel Access for LAA.
3GPP TSG RAN WG1 #83 R1-156763, Anaheim, California, US, Nov. 15-22, 2015, Agenda item: 6.2.3.1, Source: Samsung, Title: LAA Multi-Channel LBT.
3GPP TSG RAN WG1 #83 R1-157036, Nov. 14-22, 2015, Anaheim, USA, Agenda item: 6.2.3.1, Source: Qualcomm Incorporated, Title: Adaptive ED threshold setting.
3GPP TSG RAN WG1 #83 R1-157039, Nov. 14-22, 2015, Anaheim, USA, Agenda item: 6.2.3.1, Source: Qualcomm Incorporated, Title: Multicarrier LBT operation.
3GPP TSG RAN WG1 82bis Meeting, R1-155096, Malmo, Sweden, Oct. 5-9, 2015, Title: Evaluations for energy detection threshold.
3GPP TSG RAN WG1 82bis Meeting, R1-155097, Malmo, Sweden, Oct. 5-9, 2015, Title: Adaptation rules of energy detection threshold.
3GPP TSG RAN WG1 83 Meeting R1-156914, Anaheim, USA, Nov. 15-22, 2015, Agenda Item: 6.2.3.1, Source: Huawei, HiSilicon, Title: Remaining LBT parameters for LAA DL.
R1-163141, 3GPP TSG RAN WG1 Meeting #84bis, Busan, Korea, Apr. 11-15, 2016, Source: Ericsson, Title: On UL Subframe Structure for Enhanced LAA.
R1-163165, 3GPP TSG RAN WG1 Meeting #84bis, Busan, Korea, Apr. 11-15, 2016, Agenda Item: 7.3.1.1, Source: Xinwei, Title: Discussion on Partial Subframe Utilization for PUSCH.
R1-163207, 3GPP TSG-RAN WG1 Meeting 84bis, Apr. 11-15, 2016, Busan, Korea, Source: Panasonic, Title: Uplink Subframe Structure.
3GPP TS 36.211 V13.3.0 (Sep. 2016); Technical Specification; 3rd Generation Partnership Project; Technical Specification Group Radio Access Network; Evolved Universal Terrestrial Radio Access (E-UTRA);Physical channels and modulation (Release 13).
3GPP TS 36.212 V13.3.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 13).
3GPP TS 36.213 V13.3.0 (Sep. 2016); Technical Specification; 3rd Generation Partnership Project; Technical Specification Group Radio Access Network; Evolved Universal Terrestrial Radio Access (E-UTRA); Physical layer procedures (Release 13).
3GPP TS 36.300 V13.5.0 (Sep. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.2.0 (Jun. 2016); Technical Specification; 3rd Generation Partnership Project; Technical Specification Group Radio Access Network; Evolved Universal Terrestrial Radio Access (E-UTRA);Medium Access Control (MAC) protocol specification (Release 13).
3GPP TS 36.331 V13.2.0 (Jun. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 13).
IEEE 802 Interim Session; Atlanta, USA; Jan. 11-16, 2015; Title: 3GPP & unlicensed spectrum.
RP-151725; 3GPP TSG RAN Meeting #70, Sitges, Spain, Dec. 7-10, 2015; Source: ZTE, Xinwei; Title: Supporting dual connectivity in LAA.
RP-151978, 3GPP TSG RAN Meeting #70; Sitges, Spain, Dec. 7-10, 2015; revision of RP-yynnnn, Source: Ericsson, Huawei, Title: New Work Item on enhanced LAA for LTE.
RP-151979; EGPP TSG RAN Meeting #70; Sitges, Spain, Dec. 7-10, 2015; Agenda item 14.1.1; Motivation For Enhanced Licensed Assisted Access Form LTE In Rel-14.
RP-160926; 3GPP TSG RAN Meeting #72; Busan, Korea, Jun. 13-17, 2016; Source: ZTE; Title: Discussion on further enhancement of LAA for LTE.
RP-161036; 3GPP TSG RAN Meeting #72; Busan, Korea, Mar. 13-16, 2016; Title: Motivation for New Work Item for Enhancing Utilization of CA for LTE; Source: Nokia, Alcatel-Lucent Shanghai Bell.
RP-161150; 3GPP TSG RAN Meeting #72; Busan, Korea, Jun. 13-16, 2016; Source: Qualcomm Incorporated; Title: New WI proposal on LTE standalone and dual connectivity operation in unlicensed spectrum.
RP-161701; 3GPP TSG RAN Meeting #73; New Orleans, Sep. 19-22, 2016; Source: ZTE; Title: New WI proposal Further enhancement on FeLAA.
RP-161702; 3GPP TSG RAN Meeting #73; New Orleans, USA, Sep. 19-22, 2016; Motivation for New WI Further Enhancement on FeLAA.
Jan. 24, 2017—International Search Report and Written Opinion—PCT/US2016/057420.
Vu, Long Hoang et al., "Multi-Carrier listen Before Talk Mechanism for LTE in Unlicensed Spectrum," 2016 Annual Conference of the Korean Institute of Communication Sciences, 2016, pp. 388-389.
R1-153228, 3GPP TSG RAN WG1 Meeting #81, Fukuoka, Japan, May 25-29, 2015, Source: Huawei, HiSilicon, Title: UL transmission design for LAA.
R1-153135, 3GPP TSG RAN WG1 Meeting #81, Fukuoka, Japan, May 25-29, 2015, Source: Ericsson, Title: On Scheduling in LAA with Downlink and Uplink Transmissions.
Jul. 12, 2018—Korean Office Action—KR 2018-7010708.
3GPP TSG-RAN WG2 Meeting #89 R2-150186, Athens, Greece, Feb. 9-13, 2015, Source: Nokia Corporation, Nokia Networks, Title: PUCCH SCell RLM and activation/deactivation.
3GPP TSG-RAN WG2 Meeting #89 R2-150277, Athens, Greece, Feb. 9-13, 2015, Source: KT Corp., Title: Activation/deactivation of SCell carrying PUCCH.
3GPP TSG-RAN WG2 Meeting#89 R2-150238, Athens, Greece, Feb. 9-13, 2015, Agenda Item: 7.2, Source: Fujitsu, Title: Discussion on the PUCCH support on SCell.

(56) References Cited

OTHER PUBLICATIONS

3GPP TSG-RAN WG4 Meeting #68, Barcelona, Spain, Aug. 19-23, 2013, R4-134045, Agenda item: 5.2.3, Source: NSN, Nokia Corporation, Title: Remaining issues on SCell Activation Delay Requirements.
3GPP TSG-RAN1#63bis meeting R1-110069, Dublin, Ireland, Jan. 17-21, 2011, Agenda Item: 6.2.1, Source: Samsung, Title: CSI reporting and SRS timing upon SCell activation/deactivation.
3GPP TSG-RAN1#64 meeting R1-110721, Taipei, Taiwan, Feb. 21-25, 2011, Agenda item: 4, Source: Samsung, Title: CQi reporting at SCell activation.
3GPP TSG-RAN WG2 Meeting #89 R2-150380, Athens, Greece, Feb. 9-13, 2015, Source: LG Electronics Inc., Title: Potential issues in MAC for CA enhancement.
3GPP TSG RAN WG1 #80 R1-150358, Athens, Greece, Feb. 9-13, 2015, Agenda item: 7.2.2.2.1, Source: Samsung, Title: Necessary mechanisms for supporting CA with up to 32 CCs.
3GPP TSG RAN WG1 #80 R1-150359, Athens, Greece, Feb. 9-13, 2015, Agenda item: 7.2.2.2.2, Source: Samsung, Title: Enhancements to DL control signaling for CA with up to 32 CCs.
3GPP TSG RAN WG1 Meeting #80 R1-150104, Athens, Greece, Feb. 9-13, 2015, Source: CATT, Title: Enhancements to DL control signaling for Rel-13 CA.
3GPP TSG RAN WG1 Meeting #80 R1-150137, Athens, Greece, Feb. 9-13, 2015, Source: ZTE, Title: PDCCH/EPDCCH enhancements for Carrier Aggregation.
3GPP TSG RAN WG1 Meeting #80 R1-150169, Athens, Greece, Feb. 9-13, 2015, Agenda item: 7.2.2.2.2, Source: Alcatel-Lucent Shanghai Bell, Alcatel-Lucent, Title: Enhancements to DL control signalling for up to 32 component carriers.
3GPP TSG RAN WG1 Meeting #80 R1-150170, Athens, Greece, Feb. 9-13, 2015, Source: Alcatel-Lucent Shanghai Bell, Alcatel-Lucent, Title: DL PHICH enhancement to support up to 32 carriers aggregation.
3GPP TSG RAN WG1 Meeting #80 R1-150277, Athens, Greece, Feb. 9-13, 2015, Source: Sharp, Title: Considerations on DL Control Signaling for Rel-13 CA.
3GPP TSG RAN WG1 Meeting #80 R1-150293, Athens, Greece, Feb. 9-13, 2015, Agenda item: 7.2.2.2.2, Source: NEC, Title: Discussion on DL control signaling enhancements.
3GPP TSG RAN WG1 Meeting #80 R1-150315, Athens, Greece, Feb. 9-13, 2015, Source: Panasonic, Title: identified DL aspects for CA beyond 5 carriers.
3GPP TSG RAN WG1 Meeting #80 R1-150437, Athens, Greece, Feb. 9-13, 2015, Source: CMCC, Title: Design principle to support CA up to 32 carriers.
3GPP TSG RAN WG1 Meeting #80 R1-150523, Athens, Greece, Feb. 9-13, 2015, Agenda item: 7.2.2.2.2, Source: HTC, Title: DL control signaling for CA up to 32 CCs.
3GPP TSG RAN WG1 Meeting #80 R1-150593, Athens, Greece, Feb. 9-13, 2015, Source: NTT DOCOMO, INC., Title: Necessary enhancements to enable LTE CA of up to 32CCs for DL and UL.
3GPP TSG RAN WG1 Meeting #80 R1-150824, Athens, Feb. 9-13, 2015, Title: Observations on Necessary Enhancements to DL control signaling, Source: Nokia Corporation, Nokia Networks, NTT DOCOMO.
3GPP TSG-RAN WG2 Meeting #89 R2-150038, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.
3GPP TSG RAN WG1 Meeting #80 R1-150495, Athens, Greece, Feb. 9-13, 2015, Agenda item: 7.2.2.2.2, Source: Nokia Corporation, Nokia Networks, Title: On DL control signalling for up to 32 component carriers.
3GPP TSG-RAN WG1#80 R1-150323, Athens, Greece, Feb. 9-13, 2015, Source: Ericsson, Title: DL control signaling enhancements for up to 32 CCs.
3GPP TSG-RAN WG2 meeting #89 R2-150149, Athens, Greece, Feb. 9-13, 2015, Source: ZTE, Title: The principle of grouping PUCCH cell.

3GPP TSG-RAN2 #89 Meeting R2-150289, Athens, Greece, Feb. 9-13, 2015, Source: MediaTek Inc., Title: Cross-carrier scheduling for CA enhancement beyond 5CCs.
3GPP TSG-RAN2 #89 Meeting R2-150290, Athens, Greece, Feb. 9-13, 2015, Source: MediaTek Inc., Title: PUCCH on SCell for CA enhancement beyond 5CCs.
3GPP TSG RAN WG1 #80 R1-150357, Athens, Greece, Feb. 9-13, 2015, Agenda item: 7.2.2.1, Source: Samsung, Title: PUCCH Transmission on SCell for CA.
3GPP TSG RAN WG1 #80 R1-150361, Athens, Greece, Feb. 9-13, 2015, Agenda item: 7.2.2.2.3, Source: Samsung, Title: CSI Transmission for Enhanced CA.
3GPP TSG RAN WG1 #80 R1-150468, Feb. 9-13, 2015, Athens, Greece, Agenda item: 7.2.2.1, Source: Qualcomm Incorporated, Title: PUCCH on SCell.
3GPP TSG RAN WG1 #80 R1-150473, Feb. 9-13, 2015, Athens, Greece, Agenda item: 7.2.2.2.3, Source: Qualcomm Incorporated, Title: CSI feedback for up to 32 component carriers.
3GPP TSG RAN WG1 #80 R1-150742, Feb. 9-13, 2015, Athens, Greece, Agenda item: 7.2.2.2.3, Source: Qualcomm Incorporated, Title: HARQ ACK for up to 32 DL Carriers.
3GPP TSG RAN WG1 #80 R1-150823, Athens, Greece, Feb. 9-13, 2015, Title: WF on PUCCH on SCell for CA, Source: NTT DOCOMO, NEC, Sharp, Softbank Mobile, Intel, Ericsson, KDDI.
3GPP TSG RAN WG1 #80, Athens, Greece, Feb. 9-13, 2015, R1-150822, Title: Way Forward on PUCCH on SCell for CA, Source: Ericsson, NEC, Sharp, NTT DOCOMO, ZTE.
3GPP TSG RAN WG1 #80, Athens, Greece, Feb. 9-13, 2015, R1-150926, Title: WF on target scenarios for UCI feeback design, Source: Ericsson, CATT.
3GPP TSG RAN WG1 Meeting #80 R1-150101, Athens, Greece, Feb. 9-13, 2015, Source: CATT, Title: PUCCH on SCell for Rel-13 CA.
3GPP TSG RAN WG1 Meeting #80 R1-150103, Athens, Greece, Feb. 9-13, 2015, Source: CATT, Title: Enhancements to support carrier aggregation with up to 32 component carriers.
3GPP TSG RAN WG1 Meeting #80 R1-150106, Athens, Greece, Feb. 9-13, 2015, Source: CATT, Title: Periodic CSI feedback for Rel-13 CA.
3GPP TSG RAN WG1 Meeting #80 R1-150135, Athens, Greece, Feb. 9-13, 2015, Source: ZTE, Title: Further CA enhancement to support PUCCH on SCell.
3GPP TSG RAN WG1 Meeting #80 R1-150168, Athens, Greece, Feb. 9-13, 2015, Source: Alcatel-Lucent Shanghai Bell, Alcatel-Lucent, Title: CA enhancement to support up to 32 carrier aggregation.
3GPP TSG RAN WG1 Meeting #80 R1-150171, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150207, Athens, Greece, Feb. 9-13, 2015, Agenda Item: 7.2.2.2.1, Source: LG Electronics, Title: Necessary mechanisms and enhancements to support CA of up to 32 carriers.
3GPP TSG RAN WG1 Meeting #80 R1-150276, Athens, Greece, Feb. 9-13, 2015, Source: Sharp, Title: Considerations on PUCCH for Rel-13 CA.
3GPP TSG RAN WG1 Meeting #80 R1-150294, Athens, Greece, Feb. 9-13, 2015, Agenda item: 7.2.2.2.3, Source: NEC, Title: Discussion on UL control signaling enhancements.
3GPP TSG RAN WG1 Meeting #80 R1-150390, Athens, Greece, Feb. 9-13, 2015, Agenda Item: 7.2.2.2.1, Source: Huawei, HiSilicon, Title: On CA enhancements supporting up to 32 component .carriers.
3GPP TSG RAN WG1 Meeting #80 R1-150412, Athens, Greece, Feb. 9-13, 2015, Agenda Item: 7.2.2.2.3, Source: Huawei, HiSilicon, Title: CSI feedback enhancement for carrier aggregation enhancement beyond 5 carriers.
3GPP TSG RAN WG1 Meeting #80 R1-150489, Athens, Greece, Nov. 17-21, 2014, Source: ITL Inc., Title: Uplink control signaling enhancements for b5C CA.

(56) References Cited

OTHER PUBLICATIONS

3GPP TSG RAN WG1 Meeting #80 R1-150509, Athens, Greece, Feb. 9-13, 2015, Source: NTT DOCOMO NC., Title: PUCCH on SCell for UEs supporting UL-CA.
3GPP TSG RAN WG1 Meeting #80 R1-150510, Athens, Greece, Feb. 9-13, 2015, Source: NTT DOCOMO, NC., Title: Initial views on CA enhancements to support up to 32 component carriers.
3GPP TSG RAN WG1 Meeting #80 R1-150699, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150825, Athens, Feb. 9-13, 2015, Title: Observations on Necessary Enhancements to UL control signaling, Source: Nokia Networks, Nokia Corporation, NTT DOCOMO.
R1-160561, GPP TSG RAN WG1 Meeting #84, St Julian's, Malta, Feb. 15-19, 2016, Agenda item: 7.3.1.1, Source: Samsung, Title: Discussion on UL power control for UL LAA.
R1-152739, 3GPP TSG RAN WG1 meeting #81, Fukuoka, Japan, May 25-29, 2015, Agenda Item: 6.2.4.3, Source: LG Electronics, Title: UL power control in LAA.
R1-155472, 3GPP TSG RAN WG1 #82bis, Malmo, Sweden, Oct. 5-9, 2015, Agenda item: 7.2.3.3, Source: Samsung, Title: Impact of LAA dynamic power control.
R1-160886, 3GPP TSG RAN WG1 #84, Feb. 15-19, 2016, St. Julian's, Malta, Agenda item: 7.3.1.1, Source: Qualcomm Incorporated, Title: PUSCH power control.
R1-162476, 3GPP TSG RAN WG1 meeting #84bis, Busan, Korea, Apr. 11-15, 2016, Agenda Item: 7.3.1.6, Source: LG Electronics, Title: Power control in LAA uplink.
R1-162662, 3GPP TSG RAN WG1 Meeting #84bis, Busan, Korea Apr. 11-15, 2016, Agenda Item: 7.3.1.1 Source Samsung, Title: Discussion on UL power control for UL LAA.
R1-163023, 3GPP TSG RAN WG1 #84bis, Apr. 11-15, 2016, Busan, Korea, Agenda item: 7.3.1.1, Source: Qualcomm Incorporated, Title: PUSCH power control.
R1-163762, 3GPP TSG RAN WG1 #84bis, Busan, Korea, Apr. 11-15, 2016, Agenda item: 7.3.1.6, WF on uplink power control in LAA.
R1-164918, 3GPP TSG-RAN WG1 Meeting #85, Nanjing, China, May 23-27, 2016, Agenda item: 6.2.1.1, Source: Nokia, Alcatel-Lucent Shanghai Bell, Title: On PUSCH Transmit Power on LAA SCells.
R1-165557, 3GPP TSG RAN WG1 #85, Nanjing, China, May 23-27, 2016, Agenda item: 6.2.1.1, WF on uplink power control in LAA.
R1-167026, 3GPP TSG-RAN WG1 Meeting #86, Gothenburg, Sweden, Aug. 22-26, 2016, Agenda item: 7.2.1.1, Source: Nokia, Alcatel-Lucent Shanghai Bell, Title: Remaining Issues on LAA SCell PUSCH Transmit Power.
RP-141188, 3GPP TSG RAN Meeting #65, Edinburgh, Scotland, Sep. 9-12, 2014, Source: ZTE, Title: Supporting dual connectivity in LTE-U.
Samsung, "Text Proposal for PHR in dual connectivity", May 19-23, 2014, pp. 1-7, 3GPP TSG RAN WG2 #86, R2-142275, Seoul, Korea.
Japanese Office Action dated Jan. 30, 2018 in Japanese Patent Application No. 2017-546998.
R2-140066, 3GPP TSG RAN WG2 Meeting #85, Prague, Czech Republic, Feb. 10-14, 2014, Title: Consideration on PHR for TDD eiMTA.
3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN meeting #67, Shanghai, China, Mar. 9-12, 2015, RP-150272, Status Report to TSG, Agenda item: 11.3.4, Title: LTE Carrier Aggregation Enhancement Beyond 5 Carriers.
3GPP TSG RAN WG1 Meeting #80 R1-150102, Athens, Greece, Feb. 9-13, 2015, Source: CATT, Title: Uplink power control to support PUCCH on SCell for Rel-13 CA.
3GPP TSG RAN WG1 Meeting #80bis R1-15xxxx, Belgrade, Serbia, Apr. 20-24, 2015, Source: MCC Support, Title: Draft Report of 3GPP TSG RAN WGl #80 v0.2.0, Athens, Greece, Feb. 9-13, 2015.
3GPP TSG RAN WG2 Meeting #89 R2-150169, Athens, Greece, Feb. 9-13, 2015, Source: Intel Corporation, Title: Considerations for PUCCH on SCell in carrier aggregation.
3GPP TSG-RAN WG1 #80 R1-150085, Athens, Greece, Feb. 9-13, 2015, Source: Intel Corporation, Title: Support of PUCCH on Scell for CA.
3GPP TSG-RAN WG1#80 R1-150321, Athens, Greece, Feb. 9-13, 2015, Source: Ericsson, Title: PUCCH on SCell or carrier aggregation.
3GPP TSG-RAN WG2 #89 R2-150112, Feb. 9-13, 2015, Athens, Greece, Source: NTT DOCOMO, INC., Title: Discussion on PUCCH on SCell.
3GPP TSG-RAN WG2 #89 Tdoc R2-150389, Athens, Greece, Feb. 9-13, 2015, Source: Ericsson, Title: PUCCH on SCell.
3GPP TSG-RAN WG2 Meeting #80 R1-150167, Athens, Greece, Feb. 9-13, 2015, Source: Alcatel-Lucent, Alcatel-Lucent Shanghai Bell, Title: PUCCH on SCell for CA enhancement.
3GPP TSG-RAN WG2 Meeting #89 R2-150527, Athens, Greece, Feb. 9-13, 2015, Source: Qualcomm Incorporated, Title: General principles for the support of PUCCH on SCell.
3GPP TSG-RAN WG2 Meeting #89 R2-150151, Athens, Greece, Feb. 9-13, 2015, Source: ZTE, Title: Discussion on the impact for the support of PUCCH on SCell, Agenda item: 7.2.
3GPP TSG-RAN WG2 Meeting #89 R2-150406, Athens, Greece, Feb. 9-13, 2015, Source: Alcatel-Lucent, Alcatel-Lucent Shanghai Bell, Title: Considerations on PUCCH on SCell.
3GPP TSG-RAN WG2 Meeting #89 R2-150410, Athens, Greece, Feb. 9-13, 2015, Agenda item: 7.2, Source: Nokia Corporation, Nokia Networks, Title: PHR for SCell with PUCCH, WID/SID: LTE_CA_enh_b5G-Core-Release 13.
3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.
3GPP TSG RAN WG1 Meeting #81 R1-153295, Fukuoka, Japan, May 25-29, 2015, Source: Institute for Information Industry (III), Title: Discussion on Dynamic Selection of SR PUCCH Resources.
3GPP TSG RAN WG2 Meeting #89 R2-150264, Athens, Greece, Feb. 9-13, 2015, Source: CATT, Title: Discussion on the functionality of PUCCH SCell.
3GPP TSG RAN WG2 Meeting RAN2#89, Athens, Greece, Feb. 9-13, 2015, R2-150403, Agenda Item: 7.2, Source: NEC, Title: PUCCH on Scell.
3GPP TSG-RAN WG2 Meeting #89 R2-150129, Athens, Greece, Feb. 9-13, 2015, Agenda Item: 7.2, Source: Nokia Networks, Nokia Corporation, Title: SR on SCell, WID/SID: LTE_CA_enh_b5C-Core Release 13.
3GPP TSG-RAN WG2 Meeting #89 R2-150278, Athens, Greece, Feb. 9-13, 2015, Source: Microsoft Corporation, Title: SCell PUCCH for CA.

(56) References Cited

OTHER PUBLICATIONS

3GPP TSG-RAN WG2 Meeting #89 R2-150372, Athens, Greece, Feb. 9-13, 2015, Source: Huawei, HiSilicon, Title: Introduce PUCCH on SCell for CA beyond 5 carriers.
3GPP TSG-RAN WG2 Meeting #90 R2-152513, Fukuoka, Japan, May 25-29, 2015, Title: SR on PUCCH-SCell, Source to WG: Ericsson.
3GPP TSG-RAN2 Meeting #64bis, Ljubljana, Slovenia, Jan. 12-16, 2009, R2-090659, Title: S PRC Parameters for MAG and RLG, Source to WG: Nokia Siemens Networks, Nokia Corporation, Source to TSG: R2, Work item code: LTE-L23.
3GPP TSG-RAN2#72 meeting Tdoc XR2-106513, Jacksonville, U.S. Nov. 15-19, 2010, Agenda Item: 7.1.4.3, Source: Samsung, Title: SR handling in CA.
Jan. 24, 2018—Japanese Office Action—JP 2017-546843.
Apr. 5, 2018—Korean Office Action—KR 2017-7025399.
3GPP TS 36.133 V12.6.0 (Dec. 2014), Technical Specification, 3rd Generation Partnership Project; Technical Specification Group Radio Access Network; Evolved Universal Terrestrial Radio Access (E-UTRA); Requirements for support of radio resource management, Valbonne, France.
3GPP TSG RAN WG2 Meeting #89 R2-150150, Athens, Greece, Feb. 9-13, 2015, Source: ZTE, Title: Activation/Deactivation for SCell carrying PUCCH.
3GPP TSG RAN WG2 Meeting #89 R2-150263, Athens, Greece, Feb. 9-13, 2015, Source: CATT, Title: Introduction of PUCCH Cell Group.
3GPP TSG-RAN WG2 #87, Aug. 18-22, 2014, Dresden, Germany, R2-143073, Update of R2-141967, Source: NTT DOCOMO, INC, Title: Support of PUCCH on SCell for CA-RAN2 aspects.
3GPP TSG-RAN WG2 Meeting #72bis, Dublin, Ireland, Jan. 17-21, 2011, R2-110113, Agenda item: 7.1.4, Source: Huawei, Title: CQI Reporting at Activation.
3GPP TSG-RAN WG2 Meeting #87, Aug. 18-22, 2014, Dresden, Germany, R2-143117, Agenda Item: 6.1.2, Source: Samsung, Title: Discussion on PHR triggering due to SCell activation.
3GPP TSG RAN WG1 83 Meeting, R1-156437, Anaheim, USA, Nov. 15-22, 2015, Agenda Item: 6.2.3.1, Source: Huawei, HiSilicon, Title: Adaptation rules of energy detection threshold.
3GPP TSG RAN WG1 Meeting #81, R1-152581, Fukuoka, Japan, May 25-29, 2015, Source: CATT, Title: Discontinuous transmission for LAA.
3GPP TSG RAN WG1 Meeting #81, R1-152816, Fukuoka, Japan, May 25-29, 2015, Source: Nokia Networks, Title: On the remaining PHY issues for LAA UL operation.
3GPP TSG RAN WG1 Meeting #81, R1-152970, Fukuoka, Japan, May 25-29, 2015, Source: ZTE, Title: Overview on LAA UL.
3GPP TSG RAN WG1 Meeting #82b R1-156981, Anaheim, CA, Nov. 15-22, 2015, Agenda item: 6.2.3.1, Source: CableLabs, Title: Limitations of Multi-carrier Allocation Scheduling.
3GPP TSG RAN WG1 Meeting #82bis, R1-155592, Malmö, Sweden, Oct. 5-9, 2015, Agenda item: 7.2.3.1, Source: HTC, Title: Discussion on Adaptation Rules of the Maximum Energy DetectionThreshold in LAA Coexistence.
3GPP TSG RAN WG1 Meeting #82bis, R1-155310, Malmö, Sweden, Oct. 5-9, 2015, Agenda Item: 7.2.3.1, Title: Energy detection threshold for LAA.
3GPP TSG RAN WG1 meeting #82bis, R1-155385, Malmö, Sweden, Oct. 5-9, 2015, Title: Energy detection threshold in LAA.
3GPP TSG RAN WG1 Meeting #82bis, R1-155626, Malmö, Sweden, Oct. 5-9, 2015, Agenda item: 7.2.3.1, Source: Alcatel-Lucent Shanghai Bell, Alcatel-Lucent, Title: Multi-carrier LBT operation for LAA.
3GPP TSG RAN WG1 Meeting #82bis, R1-155816, Malmö, Sweden, Oct. 5-9, 2015, Agenda Item: 7.2.3.1, Source: Lenovo, Title: Multi-carrier LBT operation for LAA.
3GPP TSG RAN WG1 Meeting #82bis, R1-155898, Malmö, Sweden, Oct. 5-9, 2015, Source: NTT DOCOMO, INC., Title: Views on LBT for multiple carriers.
3GPP TSG RAN WG1 Meeting #82bis, R1-156033, Malmö, Sweden, Oct. 5-9, 2015, Source: Ericsson, Title: On Channel Access Solutions for LAA Multi-Carrier Transmission.
3GPP TSG RAN WG1 Meeting #82bis, R1-156037, Malmö, Sweden, Oct. 5-9, 2015, Source: Ericsson, Title: On Adaptation of the Energy Detection Threshold for LAA.
3GPP TSG RAN WG1 Meeting #83 R1-156510, Anaheim, USA, Nov. 15-22, 2015, Agenda item: 6.2.3.1, Source: Intel Corporation, Title: Remaining Details on LBT.
3GPP TSG RAN WG1 Meeting #83 R1-156574, Anaheim, USA, Nov. 15-22, 2015, Source: CATT, Title: Remaining details of DL LBT for LAA.
3GPP TSG RAN WG1 Meeting #83 R1-156576, Anaheim, USA, Nov. 15-22, 2015, Source: CATT, Title: DL LBT for LAA multi-carrier transmission.
3GPP TSG RAN WG1 Meeting #83 R1-156762, Anaheim, USA, Nov. 15-22, 2015, Agenda Item: 6.2.3.1, Source: Samsung, Title: ED threshold adaptation for LAA.
3GPP TSG RAN WG1 Meeting #83 R1-156768, Anaheim, USA, Nov. 15-22, 2015, Agenda item: 6.2.3.1, Source: Samsung, Title: Discussion on LBT for UL transmission.
3GPP TSG RAN WG1 meeting #83 R1-156857, Anaheim, USA, Nov. 15-22, 2015, Agenda Item: 6.2.3.1, Source: LG Electronics, Title: Multi-carrier DL TX in LAA.
3GPP TSG RAN WG1 Meeting #83 R1-157014, Anaheim, USA, Nov. 15-22, 2015, Title: Multi-carrier LBT operation for LAA, Source: Alcatel-Lucent Shanghai Bell, Alcatel-Lucent.
3GPP TSG RAN WG1 Meeting #83 R1-157172, Anaheim, USA, Nov. 15-22, 2015, Agenda Item: 6.2.3.1, Source: Intel Corporation, Title: On the LAA ED threshold.
3GPP TSG RAN WG1 Meeting #83 R1-157255, Anaheim, USA, Nov. 16-20, 2015, Source: Ericsson, Title: On Energy Detection Threshold for LAA.
3GPP TSG RAN WG1 Meeting #83 R1-157258, Anaheim, USA, Nov. 16-20, 2015, Source: Ericsson, Title: On Channel Access Solutions for LAA Multi-Carrier Transmission.
3GPP TSG RAN WG1 Meeting #83 R1-157281, Anaheim, USA, Nov. 15-22, 2015, Agenda item: 6.2.3.1, Source: HTC, Title: Discussion on Adaptation Rules of the Maximum Energy DetectionThreshold in LAA Coexistence.
3GPP TSG RAN WG1 Meeting #83 R1-157330, Anaheim, USA, Nov. 15-22, 2015, Source: WILUS Inc., Title: Consideration on Multicarrier LBT for LAA.
3GPP TSG RAN WG1 Meeting 83 R1-156702, Anaheim, USA, Nov. 16-20, 2015, Source: SONY, Title: LAA energy detection adaptation rules.
3GPP TSG RAN WG1, Meeting #82bis, R1-155386, Malmö, Sweden, Oct. 5-9, 2015, Title: UL LBT design in LAA.
3GPP TSG-RAN WG1 Meeting #82BIS, R1-155914, Malmö, Sweden, Oct. 5-9, 2015, Agenda item: 7.2.3.1, Source: Institute for Information Industry (III)Title: Considerations on Energy Detection Threshold Adaptation.
3GPP TSG-RAN WG1 Meeting #83 R1-157009, Anaheim, USA, Nov. 15-22, 2015, Agenda item: 6.2.3.1, Source: Broadcom Corporation, Title: Further Discussion on LAA DL Multi-channel LBT.
3GPP TSG-RAN WG1 Meeting #83 R1-157306, Anaheim, USA, Nov. 15-22, 2015, Agenda item: 6.2.3.1, Source: Nokia Networks, Title: Multi-carrier LBT for DL LAA.
R1-143396, 3GPP TSG RAN WG1 Meeting #78, Dresden, Germany, Aug. 18-22, 2014, Source: Ericsson, Title: Summary of email discussion [77-08]:Small cell on/off transition lime reduction.
R1-152869, 3GPP TSG RAN WG1 #81, Fukuoka, Japan, May 25-29, 2015, Source: Samsung, Title: Discussion on carrier selection for LAA.
R1-153230, 3GPP TSG RAN WG1 Meeting #81, Fukuoka, Japan, May 25-29, 2015, Source: Huawei, HiSilicon, Title: Design of fast carrier switching for LAA.
R1-153646, 3GPP TSG RAN WG1 Meeting #81, Fukuoka, Japan, May 25-29, 2015, Source: Huawei, HiSilicon, Title: Draft text proposal on fast carrier selection/switching for LAA.
R1-153788, 3GPP TSG RAN WG1 Meeting #82, Beijing, China, Aug. 24-28, 2015, Source: Huawei, HiSilicon, Title: Support for UE synchronization on a LAA Scell.

(56) References Cited

OTHER PUBLICATIONS

R1-154020, 3GPP TSG RAN WG1 Meeting #82, Beijing, China, Aug. 24-28, 2015, Source: Panasonic, Title: AGC and time/frequency synchronization for transmission burst.
R1-154149, 3GPP TSG RAN WG1 #82, Beijing, China, Aug. 24-28, 2015, Source: Samsung, Tille: LAA fast carrier selection.
R1-154267, 3GPP TSG RAN WG1 meeting #82, Beijing, China, Aug. 24-28, 2015, Source: LG Electronics, Title: DL synchronization and AGC issues in LAA.
R1-154324, 3GPP TSG RAN WG1 Meeting #82, Beijing, China, Aug. 24-28, 2015, Source: Huawei, HiSilicon, Title: Support for carrier selection/switching in CA enhancement.
R1-154326, 3GPP TSG RAN WG1 Meeting #82, Beijing, China, Aug. 24-28, 2015, Source: Huawei, HiSilicon, Title: L1 indication for UE support of fast carrier selection.
R1-154347, 3GPP TSG RAN WG1 Meeting #82, Beijing, China, Aug. 24-28, 2015, Source: Huawei, HiSilicon, Title: Carrier configuration for UE support of carrier selection.
R1-154593, 3GPP TSG RAN WG1#82, Aug. 24-28, 2015, Beijing, China, Source: Motorola Mobility, Title: Activation/Deactivation procedures for LAA SCells.
R1-154635, 3GPP TSG RAN WG1 Meeting #82, Beijing, China, Aug. 24-28, 2015, Source: Ericsson, Title: Carrier Selection for LAA.
R1-154974, 3GPP TSG RAN WG1 Meeting #82, Beijing, China, Aug. 24-28, 2015, Title: WF on LAA cell selection and synchronization.
R2-152226, 3GPP TSG-RAN WG2#90, Fukuoka, Japan, May 25-29, 2015, Source: Samsung Title: LAA SCell Activation and Deactivation.
R2-152347, 3GPP TSG-RAN WG2 meeting #90, Fukuoka, Japan, May 25-29, 2015, Source: ZTE, Title: Initial Thoughts on (De)activation for LAA Scell.
R2-152362, revision of R2-151652, 3GPP TSG-RAN WG2 Meeting #90, Fukuoka, Japan, May 25-May 29, 2015, Source: LG Electronics Inc., Title: Consideration on DL MAC for unlicensed band.
R2-153163, revision of R2-152362, 3GPP TSG-RAN WG2 Meeting #91 Beijing, China, Aug. 24-Aug. 28, 2015, Source: LG Electronics Inc., Title: Consideration on DL MAC for unlicensed band.
R2-153313, 3GPP TSG-RAN WG2 Meeting #91, Beijing, China, Aug. 24-28, 2015, Source: Huawei, HiSilicon, Title: Supported functionalities and parameters for LAA cell.
R2-153431, 3GPP TSG RAN WG2 #91, Beijing, China, Aug. 24-28, 2015, Source: ETRI, Title: Discussion on Activation/Deactivation for LAA.
3GPP TSG RAN WG1 Meeting #71 R1-124676 New Orleans, USA, Nov. 12-16, 2012 Final Report of 3GPP TSG RAN WG1 #70.
Jul. 23, 2018—Japanese Office Action—JP 2018-512586.
R2-153523, 3GPP TSG-RAN WG2#91, Beijing, China, Aug. 24-28, 2015, Source: ZTE, Title: Further Thoughts on (De)activation of LAA Scell.
R2-153569, 3GPP TSG-RAN WG2 #91, Aug. 24-28, 2015, Beijing, China, Source: NTT DOCOMO, INC., Title: Discussion on deactivation for LAA.
R2-153779, 3GPP TSG-RAN WG2#91, Beijing, China, Aug. 24-28, 2015, Source: Samsung, Title: LAA SCell Aclivation and Deactivation.
R2-153799, 3GPP TSG-RAN WG2 Meeting #91, Beijing, China, Aug. 24-28, 2015, Source: KT Corp., Title: Discussion on LAA SCell Activation and Deactivation.
R1-151297, 3GPP TSG RAN WG1 Meeting #80bis, Belgrade, Serbia, Apr. 20-24, 2015, Source: Huawei, HiSilicon, Title: Evaluation results of LAA fast carrier scheduling.
R1-153071, 3GPP TSG RAN WG1 Meeting #81, Fukuoka, Japan, May 25-29, 2015, Source: Ericsson, Title: Carrier Selection for CA enhancement.
R1-154009, 3GPP TSG RAN WG1 Meeting #82, Beijing, China, Aug. 24-28, 2015, Source: Kyocera, Title: DL Transmission Design for LAA.
R1-154146, 3GPP TSG RAN WG1 #82, Beijing, China, Aug. 24-28, 2015, Source: Samsung, Title: LAA synchronization.
R1-154327, 3GPP TSG RAN WG1 82 Meeting, Beijing, China, Aug. 24-28, 2015, Source: Huawei, HiSilicon, Title: UE support of carrier selection for LAA.
3GPP TSG RAN WG1 Meeting #80bis, R1-151302, Belgrade, Serbia, Apr. 20-24, 2015, Source: Huawei, HiSilicon, Title: Support of UL transmission for LAA.
3GPP TSG RAN WG1 #80bis, R1-151404, Apr. 20-24, 2015, Belgrade, Serbia,Source: Qualcomm Incorporated, Title: Adaptive Frame Structure and DL-UL configuration for LAA.
3GPP TSG RAN WG1 Meeting #80bis, R1-151464, Belgrade, Serbia, Apr. 20-24, 2015, Source: Kyocera, Title: LAA UL Design.
3GPP TSG RAN WG1 meeting #80bis, R1-151516, Belgrade, Serbia, Apr. 20-24, 2015, Source: LG Electronics, Title: LBT operation for LAA UL.
3GPP TSG RAN WG1 Meeting #80bis, R1-151627, Belgrade, Serbia, Apr. 20-24, 2015, Source: Samsung, Title: Discussion on UL transmission for LAA.
3GPP TSG RAN WG1 Meeting #80bis, R1-151675, Belgrade, Serbia, Apr. 20-24, 2015, Source: Panasonic, Title: Discussion on UL transmission in LAA.
3GPP TSG RAN WG1 Meeting #80bis, R1-151719, Belgrade, Serbia, Apr. 20-24, 2015, Source: ZTE, Title: Potential design for LAA UL transmission.
3GPP TSG-RAN WG1 #80bis, R1-151750, Belgrade, Serbia, Apr. 20-24, 2015, Source: NVIDIA, Title: Flexible UL-DL transmission for LAA.
3GPP TSG-RAN WG1 Meeting #80bis, R1-151841, Belgrade, Serbia, Apr. 20-24, 2015, Source: Nokia Networks Title: On the PHY options for LAA UL operation.
3GPP TSG-RAN WG1 Meeting #80bis, R1-151842, Belgrade, Serbia, Apr. 20-24, 2015, Source: Nokia Networks, Title: UL LBT and Configurable Frame Structure for UL/DL operation.
3GPP TSG RAN WG1 Meeting #80bis, Belgrade, Serbia, Apr. 20-24, 2015, Source: NTT DOCOMO, INC., Title: Discussion on issues related to UL transmission in LAA.
3GPP TSG RAN WG1 meeting #80bis, R1-151973, Belgrade, Serbia, Apr. 20-24, 2015, Source: Institute for Information Industry (III), Title: On the Design of LAA Uplink Transmission.
3GPP TSG RAN WG1 Meeting #80-bis, R1-152094, Belgrade, Serbia, Apr. 20-24, 2015 Source: ETRI, Title: Discussion on the UL transmission for LAA and the potential solution thereof.
3GPP TSG RAN WG1 Meeting #81, R1-152470, Fukuoka, Japan, May 25-29, 2015 Source: Huawei, HiSilicon, Title: Frame structure for LAA DL and UL transmission operation.
3GPP TSG RAN WG1 Meeting #81, R1-152579, Fukuoka, Japan, May 25-29, 2015, Source: CATT, Title: Frequency reuse for LBE.
3GPP TSG RAN WG1 Meeting #81, R1-152580, Fukuoka, Japan, May 25-29, 2015, Source: CATT, CATR, Title: Frame structure considerations for LAA.
3GPP TSG RAN WG1 Meeting #81, R1-152649, Fukuoka, Japan, May 25-29, 2015, Source: Intel Corporation, Title: On the LAA UL: LBT, scheduling, and sub-frame structure.
3GPP TSG RAN WG1 meeting #81, R1-152737, Fukuoka, Japan, May 25-29, 2015, Source: LG Electronics, Title: Indication of DL/UL TX burst structure.
3GPP TSG RAN WG1 #81, R1-152783, May 25-29, 2015, Fukuoka, Japan, Source: Qualcomm Incorporated, Title: Adaptive Frame Structure and DL-UL configuration for LAA.
3GPP TSG RAN WG1 #81, R1-152786, May 25-29, 2015, Fukuoka, Japan Source: Qualcomm Incorporated, Title: UE procedure for receiving DL transmissions in LAA.
3GPP TSG RAN WG1 Meeting #81, R1-152817, Fukuoka, Japan, May 25-29, 2015 Source: Nokia Networks, Title: UL LBT and Configurable Frame Structure for UL/DL operation.
3GPP TSG RAN WG1 Meeting #81, R1-152872, Fukuoka, Japan, May 25-29, 2015, Source: Samsung, Title: Discussion on UL transmission for LAA.

(56) References Cited

OTHER PUBLICATIONS

3GPP TSG RAN WG1 Meeting #81, R1-152971, Fukuoka, Japan, May 25-29, 2015, Source: ZTE, Title: Remaining Issues on LAA UL.
3GPP TSG RAN WG1 Meeting #81, R1-152990, Fukuoka, Japan, May 25-29, 2015, Title: LBT and Frame Structure Design for LAA with DL and UL Source: Alcatel-Lucent Shanghai Bell, Alcatel Lucent.
3GPP TSG-RAN WG1 Meeting #80bis, R1-151459, Belgrade, Serbia, Apr. 20-24, 2015, Source: InterDigital Communications, Title: UL transmission for LAA.
R1-162858, 3GPP TSG RAN WG1 Meeting #84bis, Busan, Korea Apr. 11-15, 2016, Source: CMCC, Title: Further discussion on issues related to PUSCH transmission for LAA.
R1-160388, 3GPP TSG RAN WG1 Meeting #84, St Julian's, Malta, Feb. 15-19, 2016, Agenda Item: 7.3.1.1, Source: NEC, Title: Discussion on LAA UL transmission.
R1-160796, 3GPP TSG-RAN WG1 Meeting 84, Feb. 15-19, 2016, St Julian's, Malta, Source: Panasonic, Title: Uplink Subframe Structure.
R1-160946, 3GPP TSG RAN WG1 Meeting #84, St Julian's, Malta, Feb. 15-19, 2016, Source: NTT DOCOMO, INC., Title: Discussion on PUSCH design for eLAA UL.
R1-160947, 3GPP TSG RAN WG1 Meeting #84, St Julian's, Malta, Feb. 15-19, 2016, Source: NTT DOCOMO, INC., Title: Discussion on UL scheduling design for eLAA.
R1-160996, 3GPP TSG RAN WG1 Meeting #84, St. Julian's, Malta, Feb. 15-19, 2016, Source: Ericsson, Title: On UL Channel Access and PUSCH Design for Enhanced LAA.
R1-161079, 3GPP TSG-RAN WG1 Meeting #84, St Julian's, Malta, Feb. 15-19, 2016, Agenda Item: 7.3.1.1, Source: InterDigital Communications, Title: On UL data transmission for eLAA.
R1-162130, 3GPP TSG RAN WG1 Meeting #84bis, Busan, Korea Apr. 11-15, 2016, Agenda Item: 7.3.1.1, Source: Huawei, HiSilicon, Title: Scheduling design for eLAA.
R1-162131, 3GPP TSG RAN WG1 Meeting #84bis, Busan, Korea, Apr. 11-15, 2016, Agenda Item: 7.3.1.1, Source: Huawei, HiSilicon, Title: Discussion on CCA gap and symbol position for PUSCH and SRS for eLAA.
R1-162259, 3GPP TSG RAN WG1 Meeting #84bits, Busan, Korea Apr. 11-15, 2016, Source: CATT, Title: PUSCH design for Rel-14 eLAA.
R1-162443, 3GPP TSG RAN WG1 Meeting #84bis, Busan, Korea Apr. 11-15, 2016, Agenda Item: 7.3.1.1, Source: NEC, Title: Discussion on LAA UL partial subframe transmission.
R1-162604, 3GPP TSG RAN WG1 Meeting #84bis, Busan, Korea Apr. 11-15, 2016, Agenda Item: 7.3.1.1, Source: Huawei, HiSilicon, Title: Design for frame structure 3 with DL and UL subframes for eLAA.
R1-162728, 3GPP TSG RAN WG1 Meeting #84bis, Busan, Korea Apr. 11-15, 2016, Agenda Item: 7.3.1.1, Source: Huawei, HiSilicon, Title: Summary on [84-14] PUSCH frame structure in eLAA.
R1-162799, 3GPP TSG RAN WG1 Meeting #84bis, Busan, Korea, Apr. 11-15, 2016, Source: NTT DOCOMO INC., Title: Discussion on PUSCH design for eLAA UL.
R1-162838, 3GPP TSG RAN WG1 Meeting #84bis, Busan, Korea, Apr. 11-15, 2016, Source: Sharp, Title: Uplink subframe structure in LAA carrier.
R1-162936, 3GPP TSG RAN WG1 Meeting #84bis, Busan, Korea, Apr. 11-15, 2016, Source: MediaTek Inc., Title: eLAA PUSCH design.
Aug. 30, 2019—Japanese Office Action—JP 2018-247389.

* cited by examiner

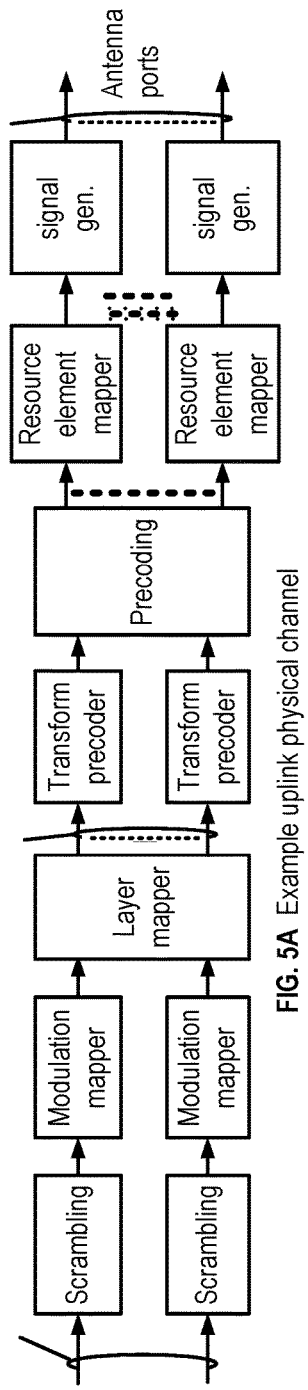
FIG. 5A Example uplink physical channel
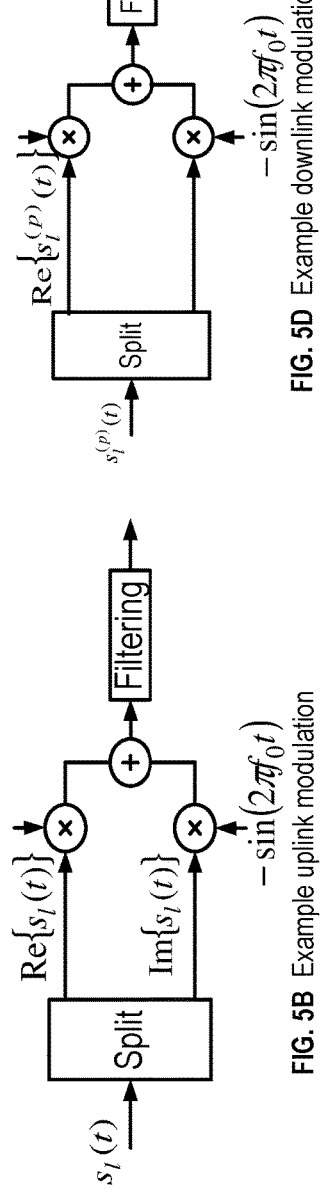
FIG. 5B Example uplink modulation
FIG. 5D Example downlink modulation
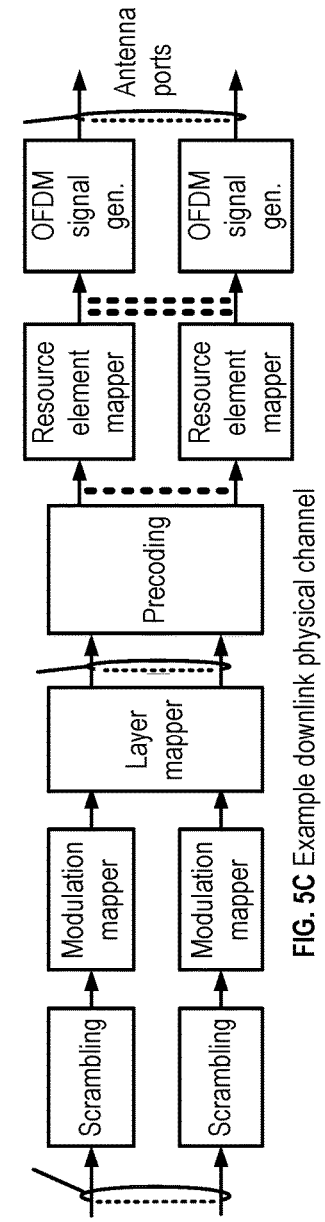
FIG. 5C Example downlink physical channel Dual-Connectivity- two MAC entities at UE side

CONTROL CHANNEL CONFIGURATION IN PARTIAL AND FULL SUBFRAMES

CROSS-REFERENCE TO RELATED APPLICATIONS

This application claims the benefit of U.S. Provisional Application No. 62/243,028, filed Oct. 17, 2015, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

DETAILED DESCRIPTION OF EMBODIMENTS

Figure 1:
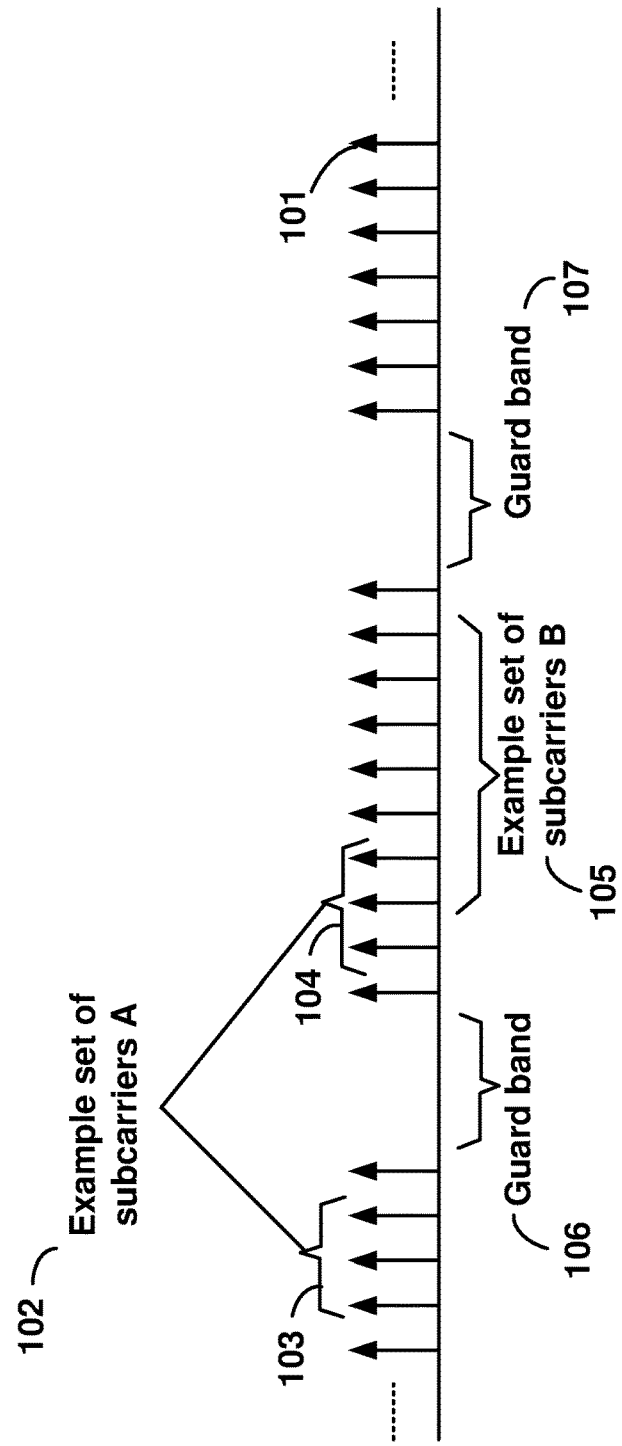
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
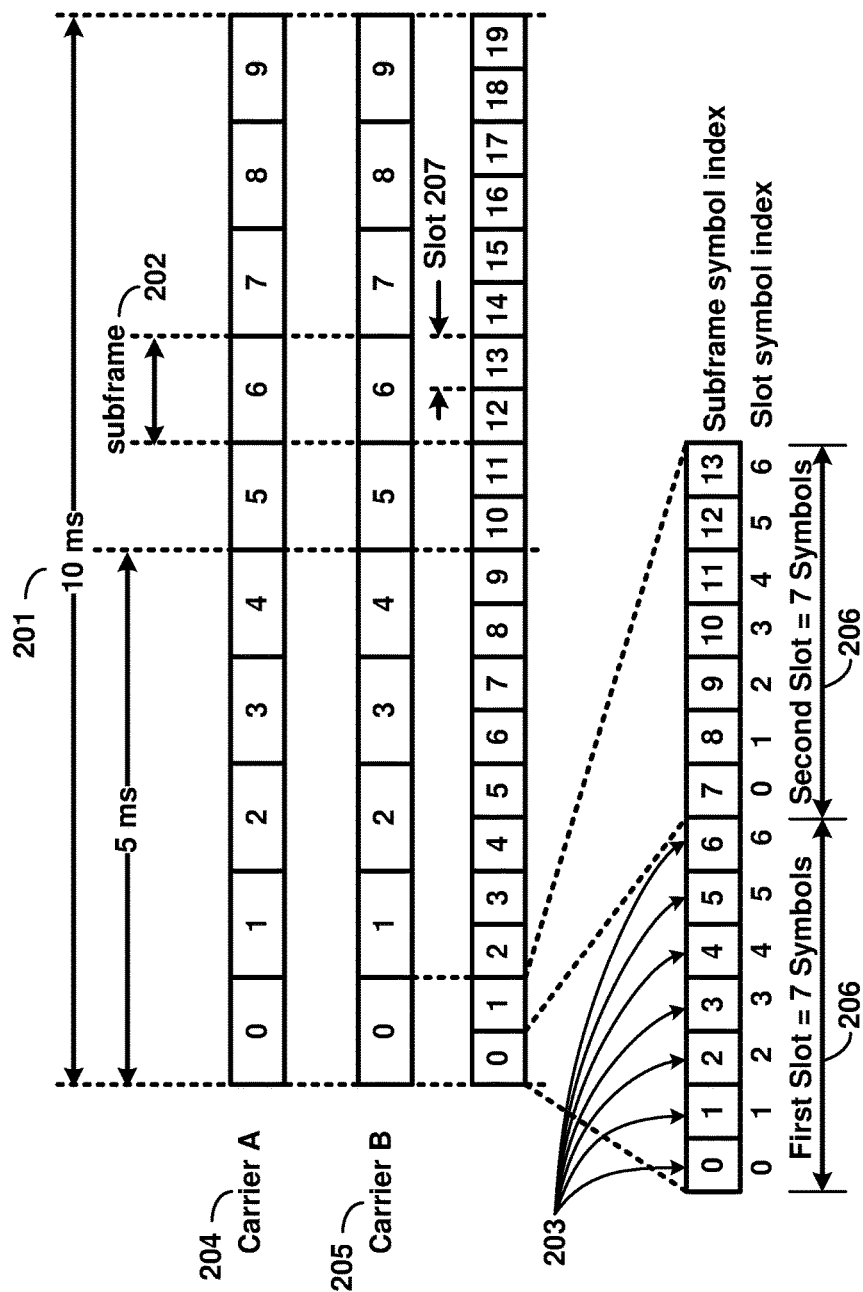
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
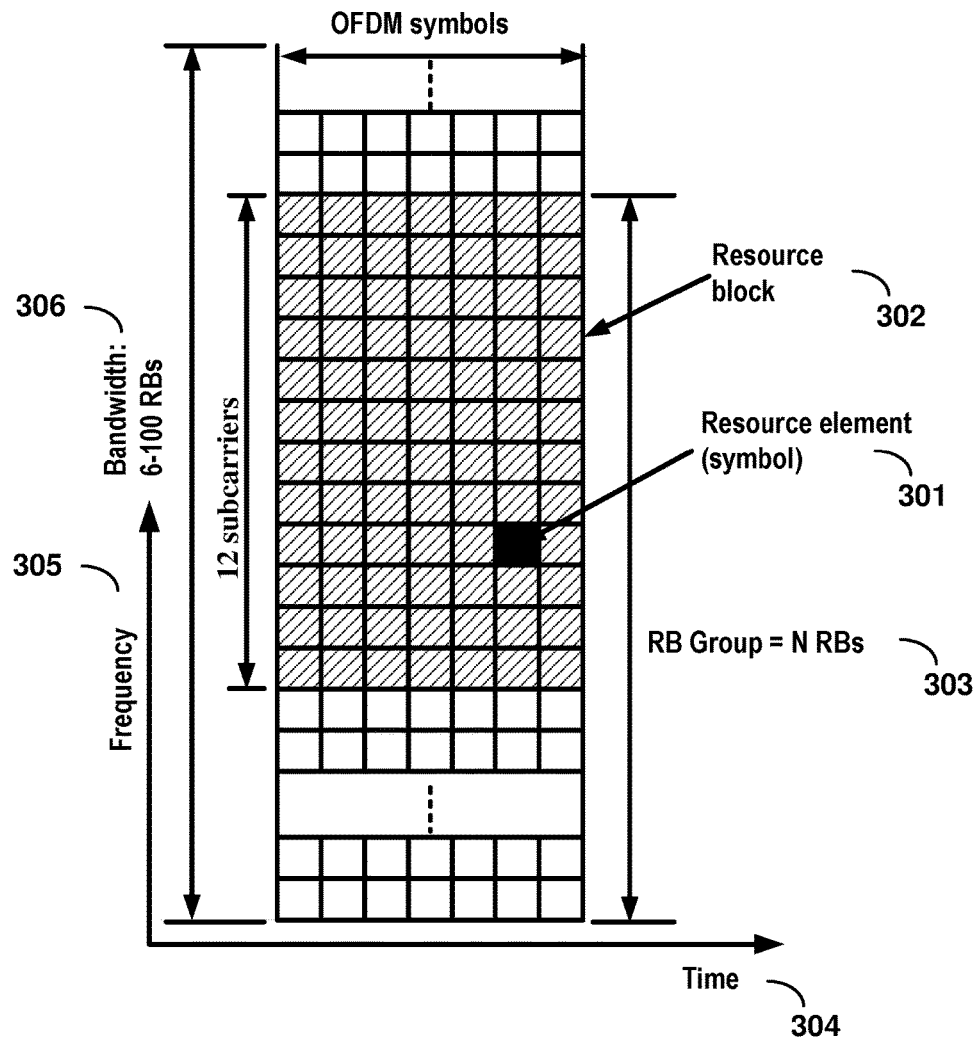
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM-DM/SC-FDMA signal for each antenna port, and/or the like.

Example modulation and up-conversion to the carrier frequency of the complex-valued DFTS-OFDM-DM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
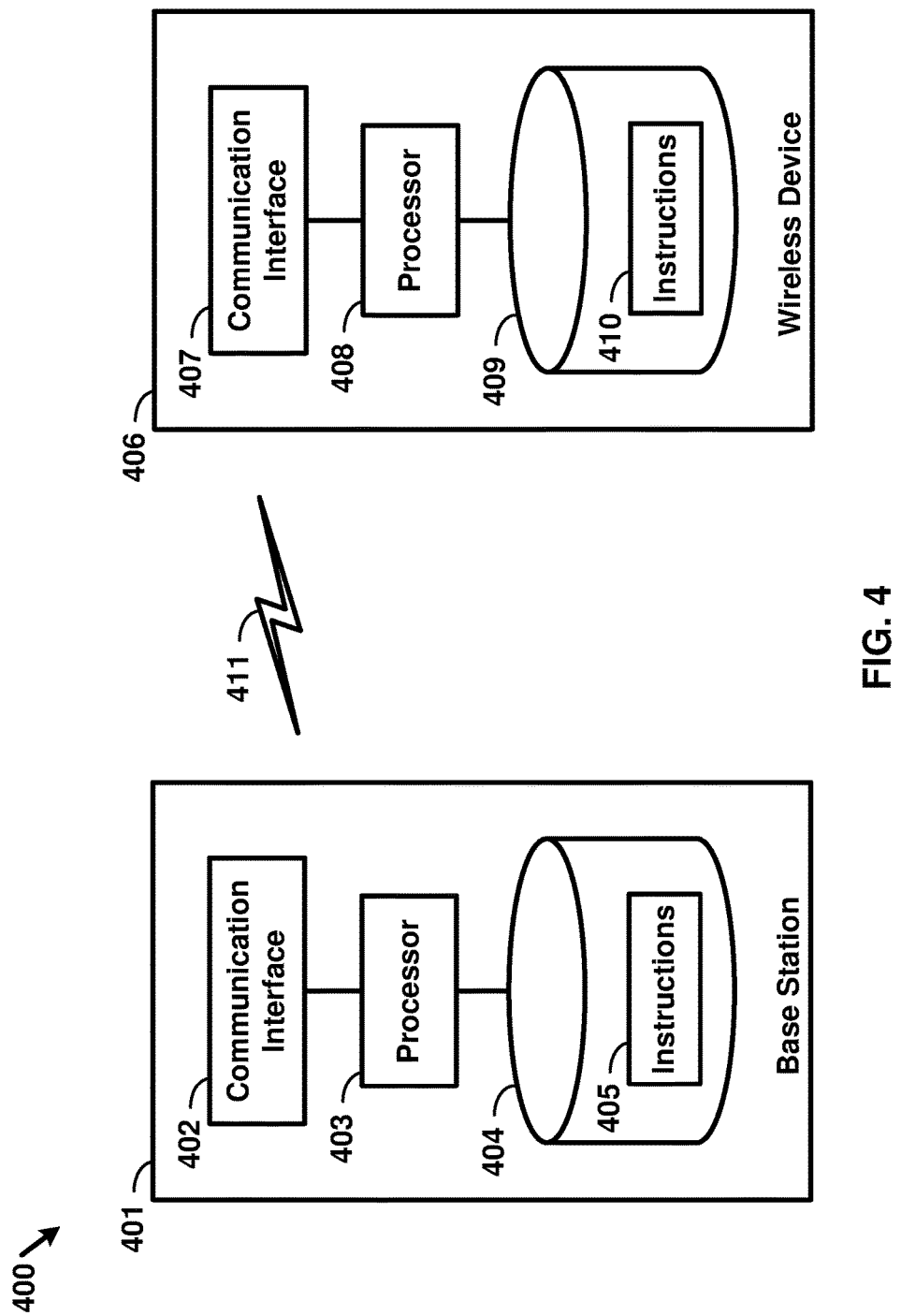
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
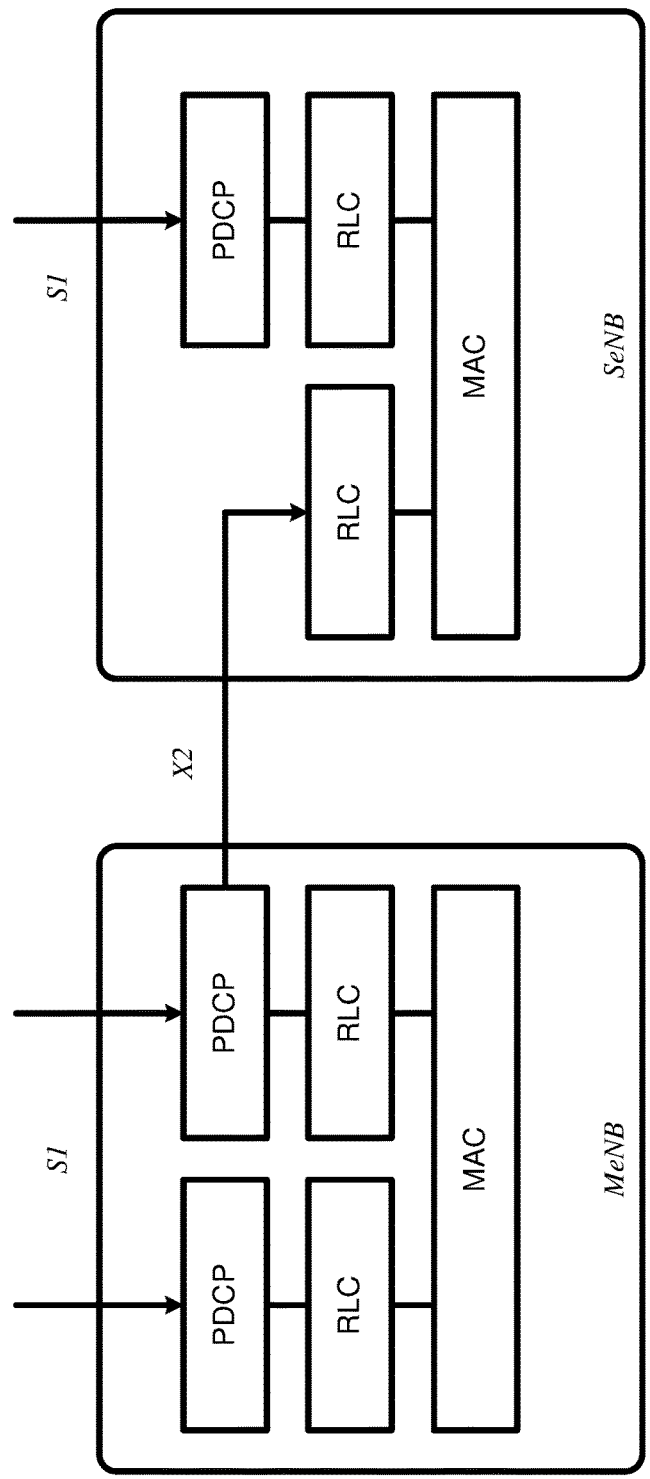
FIG. 6 is an example diagram for a protocol structure with CA and DC as per an aspect of an embodiment of the present invention.
Figure 7:
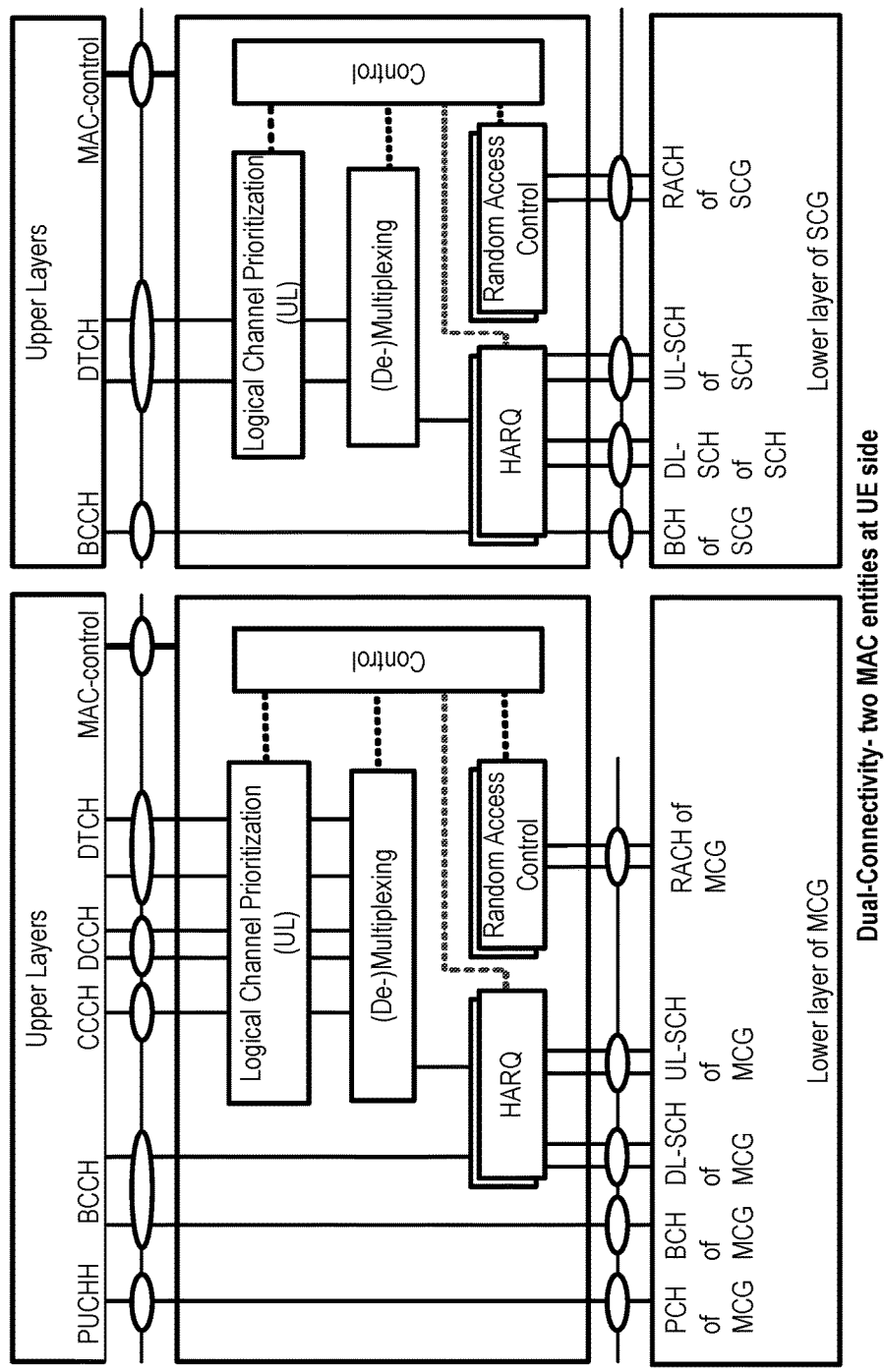
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
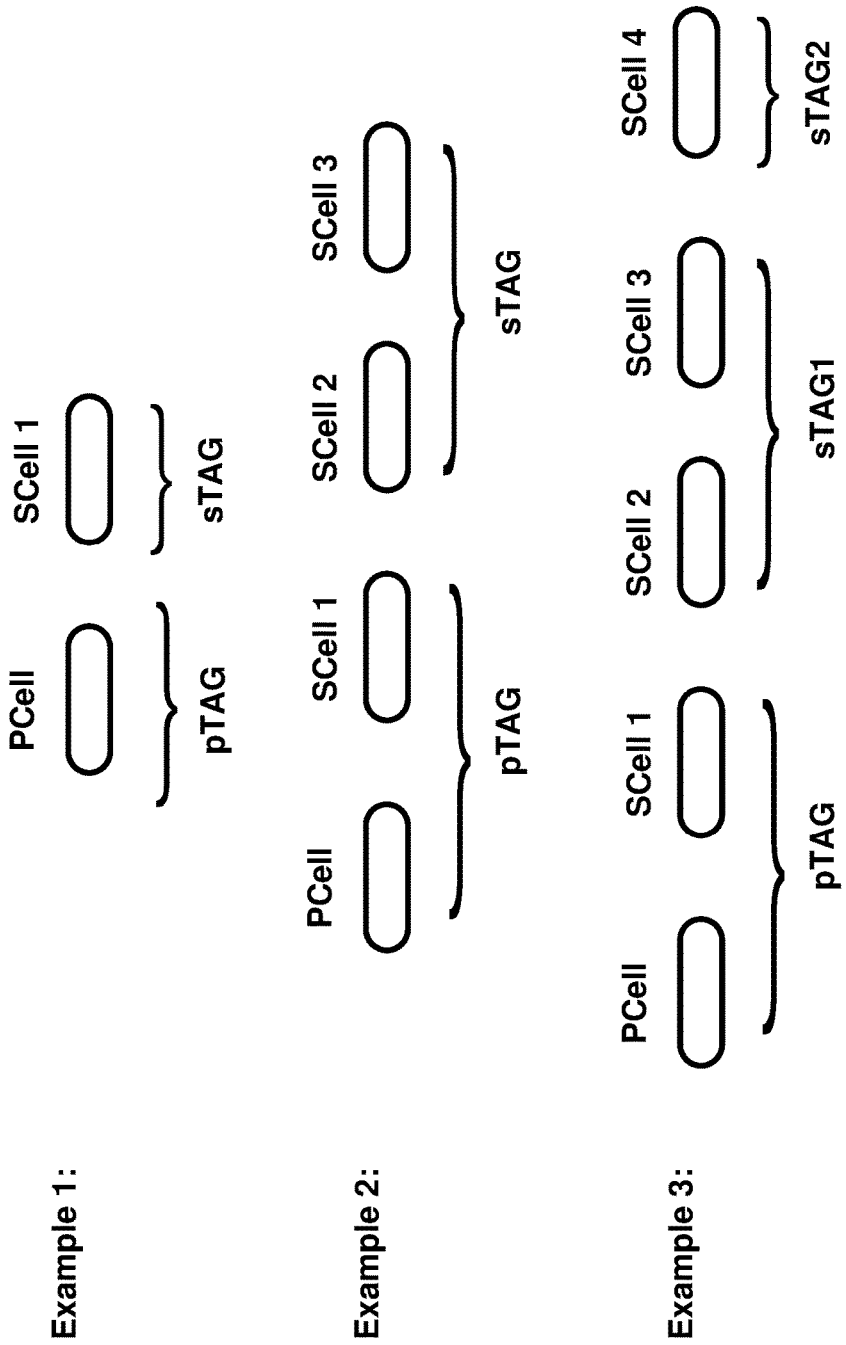
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
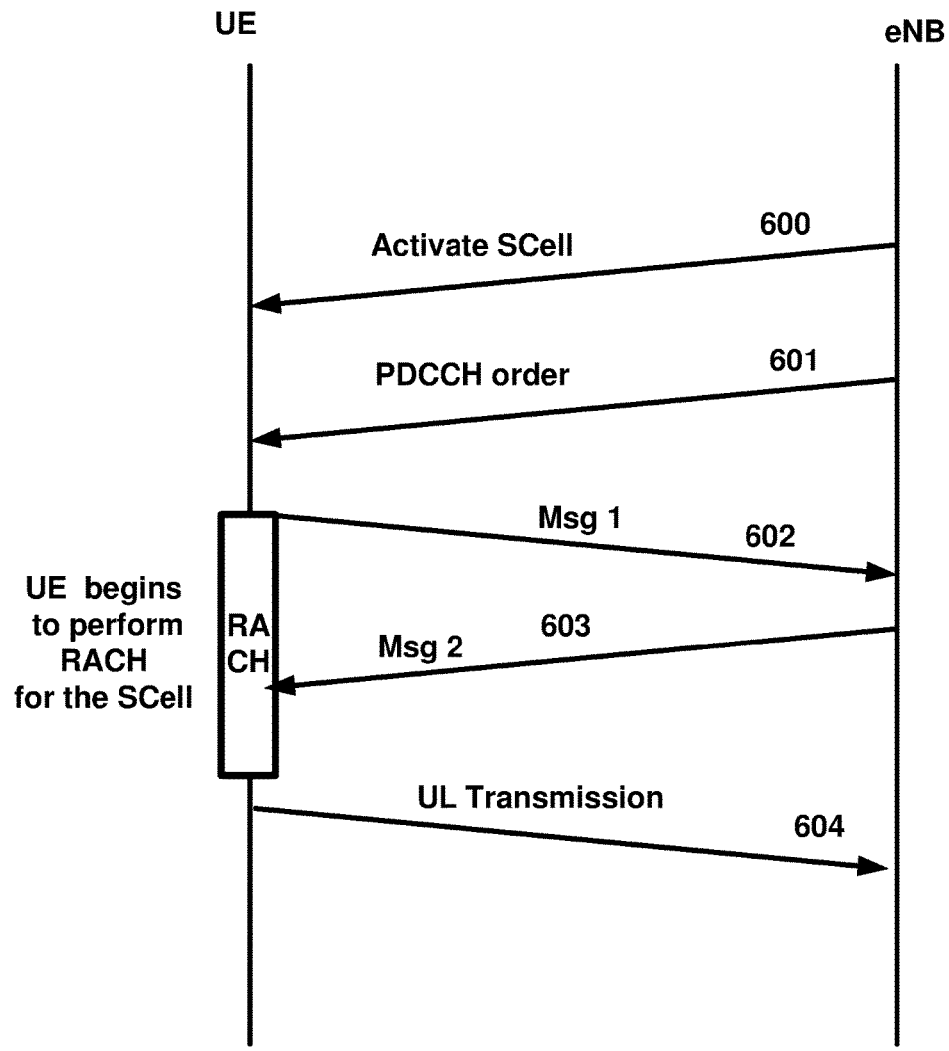
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed or configurable. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel. In an example, an eNB may transmit one or more LBT configuration parameters in one or more RRC messages and/or one or more PDCCH DCIs. In an example, some of the LBT parameters may be configured via RRC message(s) and some other LBT parameters may be signaled to a UE via PDCCH DCI (e.g. a DCI including the UL grant).

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

The following signals or combination of the following signals may provide functionality for the UE's time/frequency synchronization for the reception of a DL transmission burst in LAA SCell(s): a) serving cell's DRS for RRM measurement (DRS for RRM measurement may be used at least for coarse time/frequency synchronization), b) reference signals embedded within DL transmission bursts (e.g. CRS and/or DMRS), and/or c) primary/secondary synchronization signals. If there is an additional reference signal, this signal may be used. Reference signals may be used at least for fine time/frequency synchronization. Other candidates (e.g., initial signal, DRS) may be employed for synchronization.

DRS for RRM may also support functionality for demodulation of potential broadcast data multiplexed with DRS transmission. Other mechanism or signals (e.g., initial signal, DRS) for time/frequency synchronization may be needed to support reception of DL transmission burst.

In an example embodiment, DRS may be used at least for coarse time/frequency synchronization. Reference signals (e.g., CRS and/or DMRS) within DL transmission bursts may be used at least for fine time/frequency synchronization. Once the UE detects DRS and achieves coarse time/frequency synchronization based on that, UE may keep tracking on the synchronization using reference signals embedded in other DL TX bursts and may also use DRS. In an example, a UE may utilize DRS and/or reference signals embedded within DL transmission burst targeting the UE. In another example, a UE may utilize DRS and/or reference signals embedded within many available DL transmission bursts from the serving cell (to the UE and other UEs).

The discovery signal used for cell discovery/RRM measurement (e.g. opportunistic transmission within configured DMTC) may be used for maintaining at least coarse synchronization with the LAA cell (e.g. <±3 µs timing synchronization error and <±0.1 ppm frequency synchronization error). DRS may be subject to LBT. Inter-DRS latency generally gets worse as Wi-Fi traffic load increases. It is noted that the inter-DRS latency can be rather significant. In example scenario, there may be 55% probability that the inter-DRS latency is 40 ms and there is 5% probability that inter-DRS latency is ≥440 ms. The inter-DRS latency as seen by the UE may be worse considering the possibility of misdetection by the UE. Discovery signal misdetection may be due to actual misdetection or due to UE unavailable for detection because of DRX inter-frequency measurement during DMTC occasion.

Depending on LAA DRS design, OFDM symbol boundary may be obtained by DRS. PCell and SCell timing difference may be kept, ±30 usec order. The aggregated cells may be synchronized to some extent, e.g. aligned frame timing and SFN. Thus, similar requirement may be applied to the PCell and LAA cells on the unlicensed band. In an example, a UE may not utilize timing and frequency of the PCell for coarse synchronization of LAA cells since the timing offset may be up to ~30 us (e.g. non-located) and frequency reference may not be reliable due to the band distance between PCell and LAA cell (2 GHz Pcell and 5 GHz LAA cell). PCell timing information also may be used for time synchronization at subframe or frame level. SCell(s) may employ the same frame number and subframe number as the PCell.

PCell timing information may provide some information for symbol synchronization. By synchronizing PCell, frequency difference observed by UE between PCell and LAA Scell may be up to 0.6 ppm. For example, after 300 ms, the amount of the time drift may be 0.18 usec at most. For LAA, path delay may be relatively small as the target coverage is small. With timing drift, the multi-path delay may be within cyclic prefix length.

According to some of the various aspects of embodiments, a UE may utilize a licensed band carrier as a reference for time/frequency synchronization for CA of licensed carrier and unlicensed carrier, for example when they are in the same group (e.g. co-located). When non-collocated eNBs support licensed band PCell and unlicensed band SCell separately in a CA scenario, there may exist maximum ~30 us timing difference between PCell and unlicensed band SCell. In an example embodiment, the frequency difference between the UE synchronized with PCell and unlicensed band SCell may observe at most 0.6 ppm. An LAA may provide functionality for time/frequency synchronization on unlicensed band at least for non-collocated CA scenario.

Example reasons of frequency difference may be 1) oscillator difference among PCell, SCell and UE, 2) Doppler shift and 3) fast fading aspect. The oscillator difference of 0.6 ppm offset in 5 GHz corresponds to 3 kHz offset. Subcarrier spacing of LTE numerology is 15 kHz. This offset may need to be taken into account before FFT operation. One of the reasons of oscillator frequency variation is the temperature. If the frequency difference is not obtained at the point of DRS reception, UE may need to buffer subsequent data transmission until UE obtains this frequency difference before FFT. The frequency offset caused by this may be obtained at the reception of DRS. Doppler shift may be small value for a low mobility UE. Fast fading and residual mismatch caused by 1) and 2) may be compensated during demodulation process similar to a licensed band. This may not require introducing additional reference signals for unlicensed band.

According to some of the various aspects of embodiments, a UE may be configured to perform inter-frequency measurements on the carrier frequency layer using measurement gaps for SCells that are not configured yet. SCell receiver may not be turned on and measurements may be performed using the Pcell receiver. When a cell is added as Scell but not activated ("deactivated state"), the UE may receive relevant system information for the SCell from the Pcell. UE may be configured to perform measurements on the Scell without measurement gaps. SCell receiver may need to be occasionally turned on (e.g. for 5 ms every 160 ms) for RRM measurements using either CRS or Discovery signals. Cells may be added as Scell and activated ("activated state"), then the UE may be ready to receive PDSCH on the Scell in all subframes. The SCell receiver may perform (E)PDCCH monitoring in every subframe (for self scheduling case). SCell receiver may buffer every subframe for potential PDSCH processing (for both self and cross-carrier scheduling cases).

The eNodeB may configure the UE to measure and report RRM measurements (e.g. including RSSI) on a set of carrier frequencies. Once a suitable carrier or a set of suitable carriers is determined, carrier selected may be added as an SCell by RRC (e.g. with ~15 ms configuration delay), followed by SCell activation (with ~24 ms delay). If an SCell is deactivated, the UE may assume that no signal is transmitted by the LAA cell, except discovery signal may be transmitted when configured. If an SCell is activated, the UE is required to monitor PDCCH/EPDCCH and perform CSI measurement/reporting for the activated SCell. In a U-cell, a UE may not assume that every subframe of activated LAA SCell contains transmission. For LAA carriers, channel access may depend on the LBT procedure outcome. The network may configure and activate many carriers for the UE. The scheduler may then dynamically select carrier(s) for DL assignment or UL grant transmission.

According to some of the various aspects of embodiments, the first stage of cell level carrier selection may be during initial set up of a cell by an eNB. The eNB may scan and sense channels for interference or radar detection. eNB may configure the SCells accordingly based on the outcome of its carrier selection algorithm for efficient load balancing and interference management. The carrier selection process may be on a different time scale from the LBT/CCA procedure prior to transmissions on the carriers in unlicensed spectrum. The RSSI measurement report from UE may be used to assist the selection at eNB.

According to some of the various aspects of embodiments, the second stage of cell level carrier selection is after initial set up. The motivation is that eNB may need to do carrier (re)selection due to static load and interference change on some carriers, e.g., a new Wi-Fi AP is set up and continuously accesses the carrier causing relatively static interference. Therefore, semi-static carrier selection may be based on the eNB sensing of the averaged interference level, potential presence of radar signals if required, and traffic load on the carriers over a relatively longer time scale, as well as RRM measurement from UEs in the cell. Due to the characteristics in unlicensed spectrum, RRM measurements on LAA SCells may be enhanced to support better carrier selection. For example, the RSSI measurement may be enhanced using occupancy metric indicating the percentage of the time when RSSI is above a certain threshold. It may be noted that cell level carrier selection may be a long-term (re)selection since the process may be rather costly due to the signalling overhead and communication interruptions for UEs in a cell and it may also affect the neighbouring cells. Once a suitable set of carriers is identified, they may be configured and activated as SCells for UEs. This process may be continuous in order to keep reassessing the interference environment. Cell-level carrier selection in unlicensed spectrum may be a relatively long-term (re)selection based on eNB sensing and RRM measurement report from UE. RRM measurement on LAA SCells may be enhanced to support better carrier selection.

Carrier selection from UE perspective may be to support carrier selection for a UE among the set of carriers that the eNB has selected at the cell level. Carrier selection for the UE in unlicensed spectrum may be achieved by configuring a set of the carriers on which the UE supports simultaneous reception and transmission. The UE may perform RRM measurements on the configured carriers and report them to the eNB. The eNB may then choose which of the carriers to activate and use for transmission when it has pending data for the UE. The number of carriers to activate may then also be chosen based on the data rate needed and the RRM measurements for the different carriers. The activation delay for a carrier before scheduling data on it may be up to ~24 ms, assuming that the UE has performed RRM measurement on this carrier prior to receiving the activation command within DRX cycle. By operating the carrier selection based on activation and deactivation, the selection may also be done in the order of tens of ms.

According to some of the various aspects of embodiments, CRS may not be transmitted in an activated subframe when a burst is not scheduled in that subframe. If there are no transmissions from the eNB for an extended duration (Toff), UE demodulation performance may be impacted due to lack of reference symbols for fine time/frequency tracking. The extent of performance impact depends on the amount of time for which there are no eNB transmissions. The impact may be mitigated by more frequent transmission of discovery signals.

Discovery signals may be transmitted by the eNB even when UEs are not being scheduled. Setting discovery signal periodicity based on UE RRM measurement requirements (e.g. 160 ms) may be more efficient than setting the periodicity based on UE fine time/frequency tracking requirement.

In an example embodiment, Scell deactivation timer for the unlicensed Scell may be set to a value closer to (Toff) based on UE fine time/frequency tracking requirements. This may result in more frequent transmission of activation commands Activation commands may be needed when the eNB has data to schedule to a UE. From the UE perspective, after receiving an activation command in a particular subframe, the UE may receive CRS in a number (e.g. one or two) of following subframes. The UEs may receive CRS transmissions for a few symbols or subframes, which they may use for settling AGC loop and time-frequency tracking filters before PDSCH reception on the SCell. UEs may receive CRS transmission (e.g. in a few OFDM symbols) between reception of activation command and reception PDSCH on the Scell.

Activating a large number of carriers on dynamic bases may increase the UE power consumption, false alarm probability, and processing power requirements Improved mechanisms are needed to improve efficiency in the UE and enable fast and dynamic carrier selection/activation in a UE. Novel mechanisms may reduce UE power consumption, reduce false alarm probability and reduce processing power requirements. Carrier selection and activation may be enhanced to achieve fast dynamic carrier selection (or switching). A fast activation procedure for the carrier (e.g. shorter than the currently defined 24 ms) may be defined to improve efficiency.

Current SCell activation latency may include the MAC CE decoding latency (~3-6 ms) and SCell activation preparation time (RF preparation, up to ~18 ms) Implementation of faster processes and hardware may reduce these delays. SCell MAC activation/deactivation signalling is UE-specific. Signalling overhead may be a concern especially if the cell used for transmitting the signal is a macro cell. In an example embodiment, a L1 procedure/indicator may be introduced and/or SCell activation signalling may be enhanced.

Layer one signalling (e.g. PDCCH/EPDCCH from the PCell or another serving cell) may be implemented to signal the set of carriers that the UE may monitor for PDCCH/EPDCCH and/or measuring/reporting CSI. Control signalling latency may be ~2 ms (e.g. one 1 ms EPDCCH transmission plus 0.5 ms decoding). The DCI format may be of small size for transmission reliability and overhead reduction. To reduce control signalling overhead, the signalling may be a UE-common signalling. The indication may be sent on a carrier that the UE is currently monitoring.

In an example embodiment, a mechanism based on a L1 indication for starting/stopping monitoring of up to k activated carriers may be provided. The UE may be configured with n>=k CCs. k CCs may be activated via MAC signalling of SCell activation/deactivation. Then based on LBT progress over the CCs, a L1 indication is sent to inform which of the k CCs may be monitored by the UE and which may not. The UE may then receive data burst(s) on the monitored CCs. Another L1 indication may be sent after the bursts to alter which CCs may be monitored since then, and so on. The L1 indication may be explicit (e.g., based on a signalling) or implicit (e.g., based on self scheduling and UE detection of scheduling information on the SCell). For this example, fast carrier switching is done among at most k CCs.

In an example embodiment, a mechanism based on a L1 signalling for starting/stopping monitoring of up to m activated carriers (the number of p configured carriers may be m or higher). The activated carriers may be more than n (e.g., there may be more CCs activated for the UE than its PDSCH aggregation capability-n). The UE is configured with p CCs, and there may be up to m CCs that are activated via MAC signalling of SCell activation/deactivation. The UE may not monitor all the activated CCs. The UE may monitor at most n CCs according a L1 indication. The L1 indication needs to be explicit rather than implicit, since an implicit indication may require a UE to monitor all the up to m activated carriers at the same time, exceeding the UE's capability. For this example, fast carrier switching is done among possibly more than n CCs.

According to some of the various aspects of embodiments, SCell activation/deactivation enhancements may be considered for fast carrier switching. SCell activation/deactivation signalling is a MAC signalling. MAC signalling decoding/detection (with or without enhancements) may be slower than L1 signalling decoding/detection. It may involves decoding/detection of a L1 signalling and furthermore, a PDSCH. If SCell activation/deactivation is carried by a L1 signalling, it may still be considered for fast carrier switching. In an example embodiment, a mechanism based on a L1 signalling for activation/deactivation of the p configured carriers. The UE is configured with p CCs, but each time there are at most n CCs are activated via a L1 signalling of SCell activation/deactivation. For instance, based on LBT progress over the CCs, a L1 signalling is sent to inform which of the p CCs are activated. The UE may receive data burst(s) on the activated CCs. Another L1 signalling may be sent after the bursts to alter the activated CCs. For this example, fast carrier switching is done among possibly more than n CCs.

The control signalling may be transmitted before the eNB has gained access to the carrier via LBT process. An eNB may inform the UE to start (or stop) monitoring a carrier (whether the UE would receive a burst or not depends on the presence of PDCCH scheduling information for the carrier). An indication for starting monitoring may be used for more than one burst, until an indication for stopping monitoring is sent. The indication may be sent when the eNB expects the (E) CCA is to complete soon. A purpose of the indication may be to inform a UE to start or stop monitoring a carrier.

Transmitting the control signalling after the eNB has gained access to the carrier may incur overhead of the reservation signal (proportional to the control signalling latency). In an example, the maximum transmission burst may be 4 ms. An eNB may inform the UE to receive a burst on a carrier. The eNB may send one indication for a burst. There may be many short bursts (e.g., one burst may last up to 4 milliseconds in certain regions). The indication may be sent after (E)CCA is completed, consuming some portion of the maximum allowed transmission duration for a burst.

It may still be up to the network to transmit the control signalling before or after the channel is occupied. A UE may detect that the burst is from the serving cell (e.g. by confirming PCID). The function of the control signalling is to indicate that the UE may perform DL transmission burst detection of the serving cell. If a DL burst of the serving cell is detected, UE may monitor for possible PDCCH/EPDCCH and/or measuring the CSI on the indicated SCell.

In an example embodiment, a UE may be configured with a number of carriers potentially exceeding the maximum number of carriers over which the UE may aggregate PDSCH. RRM measurements over the configured carriers may be supported, e.g. RSSI-like measurement, extension of quasi co-location concept to across collocated intra-band carriers, and/or carrier grouping. L1 indication to the UE to start monitoring a carrier, which is selected from the configured carriers by the eNB may be supported.

According to some of the various aspects of embodiments, an eNB may configure UE with more component carriers which may potentially exceed the maximum number of carriers over which the UE may aggregate PDSCH. Then eNB may activate one or more carriers among the configured carriers to UE by the existing signalling, e.g. MAC signalling. UE may be scheduled on the one or more activated carriers dynamically based on the LBT mechanism.

A UE may switch to receive on any carrier within a set of carriers selected by the serving eNB as fast as subframe/symbol-level, while the number of carriers within the set may potentially exceed the maximum number of carriers over which the UE may aggregate PDSCH. Which carrier(s) the UE may switch to is per eNB indication. When the UE is indicated with the carrier(s) it may switch to, the UE may start to monitor the indicated carrier(s), e.g. within a few subframes, and may stop monitoring other carriers. By monitoring a carrier it meant to buffer and attempt to detect the control channels and other associated channels. The eNB indication may instruct the UE to switch to the indicated carrier(s) and monitor the carrier(s). The eNB may not instruct the UE to switch to monitor on more carriers than its PDSCH aggregation capability in a given subframe. The eNB may not schedule the UE on more carriers than its PDSCH aggregation capability. SCell configuration enhancements may allow both semi-static and fast carrier switching with reduced transition time. The delay associated with the SCell configuration signalling as well as the delay associated with the measurement process may be decreased.

In an example embodiment, fast carrier switching may support UE to switch to any carrier within a set of carriers selected by the serving eNB as fast as a few subframes/symbols. The eNB may send an indication instructing the UE to switch to the indicated carriers and monitor the carriers. Then the UE may perform the switching and start monitoring the indicated carriers. The UE stops monitoring other carriers. The eNB indication may be done in L1. A L1 procedure/indicator, or an enhancements of the SCell activation signalling may be introduced.

According to some of the various aspects of embodiments, DRS design may allow DRS transmission on an LAA SCell to be subject to LBT. The transmission of DRS within a DMTC window if LBT is applied to DRS may consider many factors. Subjected to LBT, DRS may transmitted in fixed time position within the configured DMTC. Subject to LBT, DRS may be transmitted in at least one of different time positions within the configured DMTC. The number of different time positions may be restricted. One possibility is one time position in the subframe. DRS transmissions outside of the configured DMTC may be supported.

According to some of the various aspects of embodiments, an sensing interval may allow the start of a DL transmission burst (which may not start with the DRS) containing DRS without PDSCH within the DMTC. Total sensing period may be greater than one sensing interval. Whether the above may be used for the case where transmission burst may not contain PDSCH but contains DRS, and any other reference signals or channels. The ECCA counter used for LBT category 4 for the PDSCH may be frozen during DL transmission burst containing DRS without PDSCH The RS bandwidth and density/pattern of the DRS design for LAA may support for RRM measurement based on a single DRS occasion.

According to some of the various aspects of embodiments, Discovery signal may be transmitted via a successful LBT operation. When the eNB does not have access to the channel, the discovery signal burst may not be transmitted. In an example, the discovery signal periodicity is configured to be 40 ms, and it may be possible to receive the discovery signal at least once in every 160 to 200 ms with a high probability. For example, the probability of receiving a discovery signal burst at least once in every 160 ms may greater than 97%. The UE may adjust its receiver processing to account for the potential absence of discovery signals due to lack of access to the channel. For instance, the UE may detect the presence or absence of a particular discovery signal burst using the PSS, SSS and CRS signals.

According to some of the various aspects of embodiments, the use of discovery signals that may be subject to LBT. A discovery signal burst may not be transmitted when LBT fails. Data may be transmitted in the intervening subframes. The reference signals along with control information may be used to reserve the channel prior to a discovery signal or data transmission.

For reception of data on the serving cell, AGC and fine time and frequency estimation may employ the discovery signals from the serving cell. In an example, time and frequency estimation may be performed using the PSS, SSS and/or CRS inside the discovery signal subframes. The use of two or more CRS ports may enhance synchronization performance. These signals may provide synchronization estimates that are adequate for the purpose of RRM measurements on the serving and neighboring cells. When data is to be received by the UE in a subframe that occurs a significant number of subframes after the last reception of a discovery signal on the serving cell. Fine tuning of the time and frequency estimates may be performed using the DM-RS and, if present, the CRS within the subframe in which data is received, and/or the initial signal. The signal used to reserve the channel before the actual start of data transmissions (e.g. reservation signal, initial signal, and/or burst indicator) may be used to fine tune time and frequency estimates before the reception of data. When transmitting data after a long absence of any discovery signal or other transmissions, the eNB may transmit a signal of longer duration to reserve the channel in order to facilitate the use of such a signal for timing and frequency adjustments.

Figure 10:
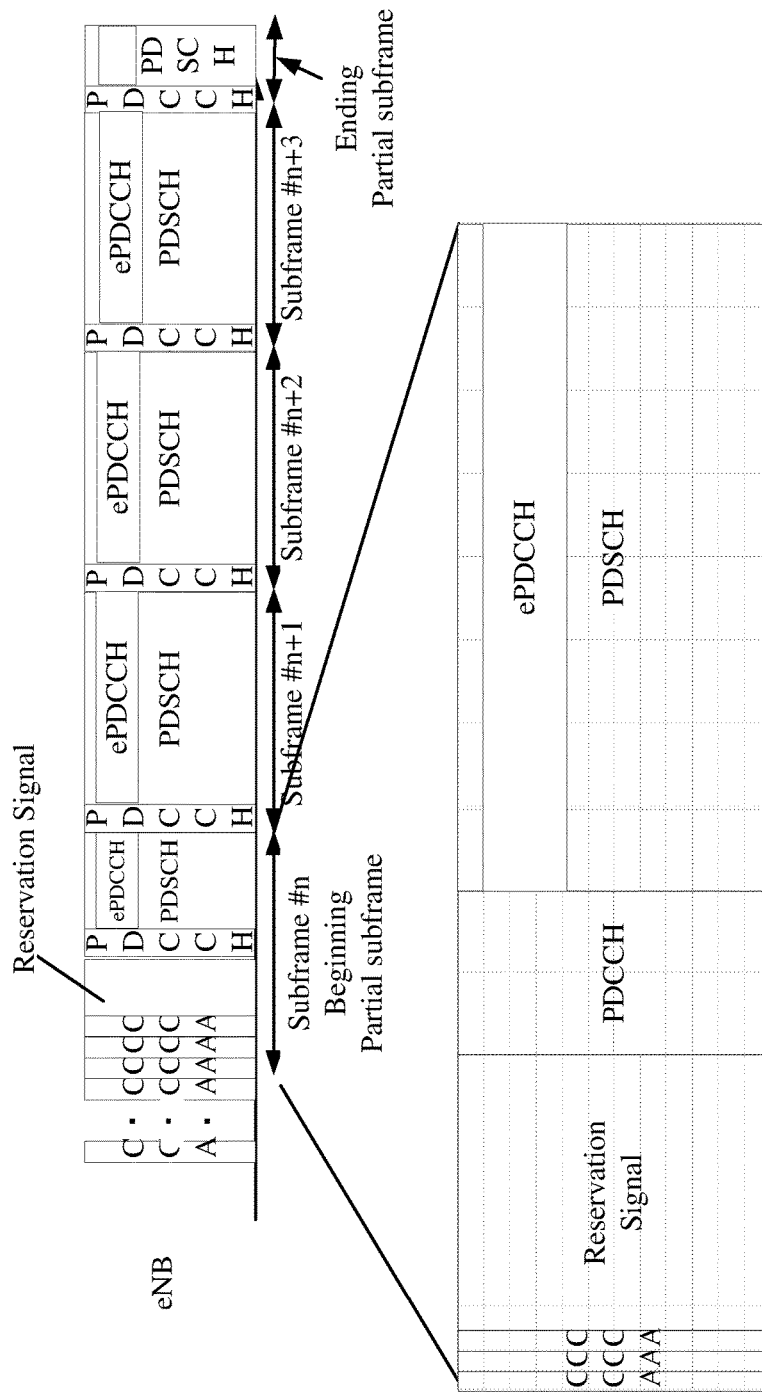
FIG. 10 is an example diagram depicting a downlink burst as per an aspect of an embodiment of the present invention.

In an example embodiment, in an unlicensed cell, a downlink burst may be started in a subframe. When an eNB accesses the channel it may transmit for a duration of one or more subframes. The duration may depend on a maximum configured burst duration in an eNB, the data available for transmission, and/or eNB scheduling algorithm FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (e.g. RRC) comprising configuration parameters of a plurality of cells. The plurality of cells may comprise at least one license cell and at least one unlicensed (e.g. LAA cell). The configuration parameters of a cell for example may comprise configuration parameters for physical channels, e.g. ePDCCH, PDSCH, PUSCH, PUCCH and/or the like. In an example embodiment, IE epdcch-Config may indicate the EPDCCH-Configuration for a cell.

The information element (IE) EPDCCH-Config in the RRC message may comprise configuration parameters of an ePDCCH and may configure ePDCCH for a cell. The IE EPDCCH-Config may specify the subframes and resource blocks for EPDCCH monitoring that E-UTRAN may configure for a serving cell. In an example, ePDCCH-Config may comprise subframePatternConfig, startSymbol, setConfigToReleaseList, and setConfigToAddModList, and other ePDCCH parameters. In an example, EPDCCH-SetConfigToAddModList may comprise SEQUENCE (SIZE(1 . . . maxEPDCCH-Set-r11)) OF EPDCCH-SetConfig. In an example, EPDCCH-SetConfigToReleaseList may comprise SEQUENCE (SIZE(1 . . . maxEPDCCH-Set-r11)) OF EPDCCH-SetConfigId. In an example, EPDCCH-SetConfig may comprise setConfigId (an identifier for an ePDCCH set), transmissionType: ENUMERATED {localised, distributed}, resourceBlockAssignment: SEQUENCE{numberPRB-Pairs: ENUMERATED {n2, n4, n8}, resourceBlockAssignment: BIT STRING (SIZE(4 . . . 38))}, dmrs-ScramblingSequenceInt: INTEGER (0 . . . 503), and pucch-ResourceStartOffset: INTEGER (0 . . . 2047), and/or other configuration parameters.

In an example, the start symbol may indicate the OFDM starting symbol for any EPDCCH and PDSCH scheduled by EPDCCH on the same cell in a subframe of a licensed cell or a full subframe of an unlicensed (e.g. LAA cell). If not present, the UE may derive the starting OFDM symbol of EPDCCH and PDSCH scheduled by EPDCCH from PCFICH. In an example, values 1, 2, and 3 may be applicable for dl-Bandwidth greater than 10 resource blocks. Values 2, 3, and 4 may be applicable otherwise. In an example, E-UTRAN may not configure the field for UEs configured with transmission mode 10.

In an example, the IE subframePatternConfig may configure the subframes which the UE may monitor the UE-specific search space on EPDCCH, except for pre-defined rules in the LTE technology standard. The ePDCCH may be transmitted in one or more subframes identified by subframePatternConfig and pre-defined rules, and may not be transmitted in other subframes. If the field is not configured when EPDCCH is configured, the UE may monitor the UE-specific search space on EPDCCH in subframes except for pre-defined rules in the LTE technology standard.

In an example, IE numberPRB-Pairs may indicate the number of physical resource-block pairs used for the EPDCCH set. For example, value n2 may correspond to 2 physical resource-block pairs; n4 corresponds to 4 physical resource-block pairs and so on. Value n8 may not be supported if dl-Bandwidth is set to 6 resource blocks. In an example, IE resourceBlockAssignment may indicate the index to a specific combination of physical resource-block pair for EPDCCH set that is pre-defined in the technology standard. The size of resourceBlockAssignment may be specified in technology standard and based on numberPRB-Pairs and the signalled value of dl-Bandwidth.

The IE dmrs-ScramblingSequenceInt may indicate the DMRS scrambling sequence initialization parameter. The IE pucch-ResourceStartOffset may indicate PUCCH format 1a and 1b resource starting offset for the EPDCCH set. The IE transmissionType may indicates whether distributed or localized EPDCCH transmission mode is used.

In an example embodiment, the wireless device may receive, from a base station, downlink control information (DCI) in the ePDCCH resources of a subframe. The DCI may be scrambled, by the base station, with the C-RNTI assigned to the wireless device. The DCI may comprise an uplink grant or a downlink grant comprising radio resources (e.g. RBs) for the wireless device.

When the DCI of a subframe comprises a downlink grant, the UE may receive from the base station one or more transport blocks, in the subframe, in radio resources indicated in the downlink grant. The wireless receive may receive the one or more transport blocks. The wireless device may transmit to the base station one or more positive or negative acknowledgement in response to receiving the one or more transport blocks. The downlink DCI may further comprise MCS, MIMO information, HARQ information (HARQ process ID, RV, and/or NDI), and/or the like for the one or more transport blocks.

When the DCI of a subframe comprises an uplink grant, the UE may transmit to the base station one or more transport blocks in a corresponding subframe, in radio resources indicated in the uplink grant. The wireless device may transmit to the base station the one or more transport blocks. The wireless device may receive from the base station one or more positive or negative acknowledgement in response to transmitting the one or more transport blocks. The uplink DCI may further comprise MCS, MIMO information, HARQ information (harq process ID, RV, NDI), power control command and/or the like for the one or more transport blocks.

In LTE-A release 11 and 12, the information element startSymbol in epdcch-Config IE indicates the OFDM starting symbol for any EPDCCH and PDSCH scheduled by EPDCCH on the same cell. If startSymbol is not present, the UE may derive the starting OFDM symbol of EPDCCH and PDSCH scheduled by EPDCCH from PCFICH. Values 1, 2, and 3 are applicable for dl-Bandwidth greater than 10 resource blocks. Values 2, 3, and 4 are applicable otherwise. E-UTRAN may not configure the field for UEs configured with transmission mode 10.

In LTE-A release 11 and 12, EPDCCH starting position may be determined according to a mechanism described here. For a given serving cell, if the UE is configured via higher layer signaling to receive PDSCH data transmissions according to transmission modes 1-9, if the UE is configured with a higher layer parameter epdcch-StartSymbol-r11, the starting OFDM symbol for EPDCCH given by index $l_{EPDCCHStart}$ in the first slot in a subframe is determined from the higher layer parameter, otherwise: the starting OFDM symbol for EPDCCH given by index $l_{EPDCCHStart}$ in the first slot in a subframe is given by the CFI value in the subframe of the given serving cell when $N_{RB}^{DL}>10$ and $l_{EPDCCHStart}$ is given by the CFI value+1 in the subframe of the given serving cell when $N_{RB}^{DL} \leq 10$.

For a given serving cell, if the UE is configured via higher layer signalling to receive PDSCH data transmissions according to transmission mode 10, for each EPDCCH-PRB-set, the starting OFDM symbol for monitoring EPDCCH in subframe k is determined from the higher layer (RRC) parameter pdsch-Start-r11 as follows. If the value of the parameter pdsch-Start-r11 belongs to {1,2,3,4}, $l'_{EPDCCHStart}$ is given by the higher layer parameter pdsch-Start-r11. Otherwise when the value of pdsch-Start-r11 is not provided by RRC: $l'_{EPDCCHStart}$ is given by the CFI value in subframe k of the given serving cell when $N_{RB}^{DL}>10$, and $l'_{EPDCCHStart}$ is given by the CFI value+1 in subframe k of the given serving cell when $N_{RB}^{DL} \leq 10$. If subframe k is indicated by the higher layer parameter mbsfn-SubframeConfigList-r11, $l_{EPDCCHStart}=\min(2, l'_{EPDCCHStart})$, otherwise $l'_{EPDCCHStart}=l'_{EPDCCHStart}$.

In LTE-A release 11 and 12, ePDCCH starting symbol may be determined according to epdcch-StartSymbol-r11, pdsch-Start-r11, CFI value, and/or other parameters shown above. For example, when mbsfn-SubframeConfigList-r11 is configured, the starting symbol may be determined according to the configuration parameters described above and some pre-defined rules.

In an example embodiment, one or two sets of ePDCCH resources may be configured on an LAA cell. In an example embodiment, the mechanisms for determining the starting symbol for ePDCCH configured on LAA cell may be determined employing an enhanced mechanism to improve radio resource utilization efficiency and reduce signaling overhead. Example embodiments provide a mechanism for determining the starting symbol of ePDCCH on downlink transmission on partial and full subframes. Example embodiments improve radio resource utilization on an LAA cell.

Transmission of an additional field indicating the ePDCCH starting symbol of a subframe via a physical layer channel signaling may increase physical layer overhead. Additional physical layer signaling for indicating ePDCCH starting symbol may increase downlink signaling overhead. In contrast, transmission of a start symbol field for ePDCCH in an RRC message may provide a semi-static method for configuration of ePDCCH starting symbol and may reduce downlink signaling overhead and provide the required flexibility in configuring the starting symbol of the ePDCCH. In an example embodiment, an eNB may transmit an RRC message comprising a start symbol field (IE) employed for determining a starting symbol of ePDCCH. In an example embodiment this field may be employed to determine the starting symbol in partial and full subframe according to a pre-defined rule. When the start symbol field is not included in the RRC message, the eNB may employ other signals or fields (e.g. CFI, PDSCH-start and/or other parameters) in determining a starting symbol for the ePDCCH in a subframe and there may be no need to specify a specific field dedicated for ePDCCH starting symbol calculation.

In an example embodiment, a UE may detect the starting symbol of a partial subframe (Offset_Symbol). The starting symbol may be determined employing detection of a pre-defined signal, e.g. an initial signal, burst indicator signal/PCFICH, CRS, and/or the like. A UE may decode (e.g. blind decode) a known signal pattern (e.g. among many possibilities) and determine the starting symbol of a partial subframe. The starting symbol of a subframe may be named Offset_symbol. The Offset_symbol is zero for a full subframe. Example of beginning partial subframe (partial subframe), a full subframe, and ending partial subframe is shown in FIG. 10.

In an example embodiment, Offset_symbol may be one of one or more possible values. The one or more possible values may be predefined, or may be configured by one or more RRC message for an LAA cell. In an example embodiment, an eNB may transmit an RRC message comprising configuration parameters of a cell. The configuration parameters may comprise one or more parameters indicating possible starting symbol values for a subframe. For example, the configuration parameters may indicate the possible starting symbol may be symbol 0 or 7 (at slot boundaries). For example, the configuration parameters may indicate the possible starting symbol may be symbol 0.

In an example, the Offset_symbol may be 7 for a partial subframe and 0 for a full subframe. The embodiments provide the needed flexibility in implementing partial subframes, wherein the starting symbol of a subframe transmission may not be zero. In an example embodiment, symbols in a subframe may be numbered from 0 to 13 (See example example FIG. 2). For example, the first symbol is symbol 0, the second symbol is symbol 1, etc. In an example, symbols in a slot may be numbered from 0 to 6. A subframe may comprise a first slot and a second slot (See example example FIG. 2).

Example embodiments provide mechanisms for determining the starting symbol for a partial subframe and a full subframe. Example control channel mapping is provided below. Other equivalent mechanisms using different formulas may be implemented, which result in the same resource element mapping.

Figure 11:
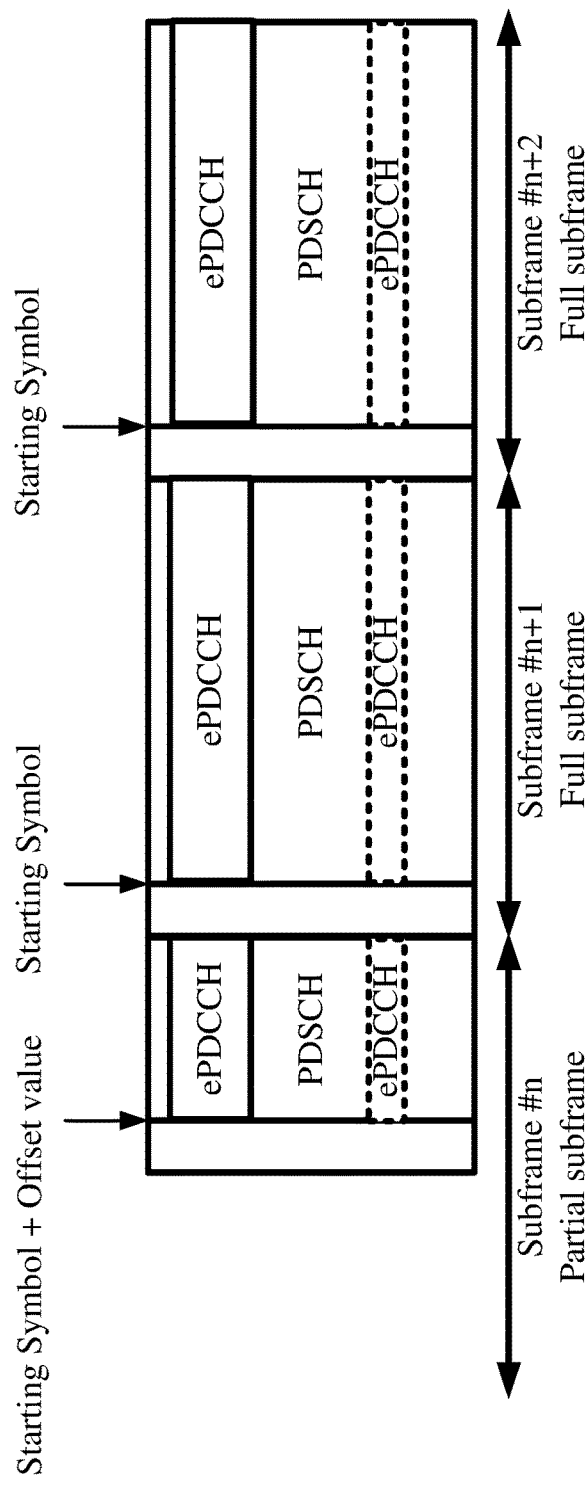
FIG. 11 is example diagrams depicting partial subframe and full subframe as per an aspect of an embodiment of the present invention.

In an example embodiment, one StartSymbol IE may be configured for ePDCCH of a cell. In a full subframe, an ePDCCH starting symbol may be the value of StartSymbol IE. In a partial subframe, the ePDCCH starting symbol may be the value of StartSymbol IE+Offset_symbol. A UE may detect Offset_symbol employing decoding the received signal (e.g. blind decoding) and employing RRC signaling (using a field in an RRC message). In an example embodiment, up to two sets of ePDCCH may be configured. The same StartSymbol IE may be applicable to one or two sets of ePDCCH and the one or two sets may have the same starting symbol. The starting symbol applicable to the one or two sets may be determined depending on whether ePDCCH is transmitted in a full subframe or a partial subframe. An example ePDCCH configuration in a full and partial subframe is shown in FIG. 11. Transmission of one StartSymbol IE for determining ePDCCH starting symbol for both partial and full subframes and for one or two sets of ePDCCH redcues the size of RRC message (compared with transmitting two or more StartSymbol IEs). An example emboidment reduces downlink signaling overhead.

In an example, a parameter in the at least one RRC message may indicate possible starting positions of transmission in a subframe of a downlink transmission burst in an LAA cell. The starting positions may be applicable to downlink data/control signal transmission and not to the reservation signals. For example, a first value of the parameter may indicate the starting position is subframe boundary, and a second value of the parameter may indicate the the starting position is either subfarme boundary or slot boundary (beginning of the first or second slot of a subframe). Reservation signal may start at any point in time depending on the base station implementation.

In an example embodiment, for a given serving cell, if the UE is configured via higher layer signaling to receive PDSCH data transmissions according to transmission modes 1-9, if the UE is configured with a higher layer parameter epdcch-StartSymbol (in an RRC message), the starting OFDM symbol for EPDCCH given by index $l_{EPDCCHStart}$ is determined from the higher layer parameter, otherwise the starting OFDM symbol for EPDCCH given by index $l_{EPDCCHStart}$ is given by the CFI (control format indicator) value in the subframe of the given serving cell when $N_{RB}^{DL}>10$, and $l_{EPDCCHStart}$ is given by the CFI value+1 in the subframe of the given serving cell when $N_{RB}^{DL} \leq 10$. In an example, in an initial partial subframe, the $l_{EPDCCHStart}$ for the ePDCCH may be offset by Offset_symbol OFDM symbols, e.g. by 7 symbols (Or equally the $l_{EPDCCHStart}$ may be applicable to the second slot.). In a full subframe, the $l_{EPDCCHStart}$ for the ePDCCH may be applicable to the first slot.

For a given serving cell, if the UE is configured via higher layer signalling to receive PDSCH data transmissions according to transmission mode 10, for each EPDCCH-PRB-set, the starting OFDM symbol for monitoring EPDCCH in subframe k is determined from the higher layer parameter pdsch-Start as follows: if the value of the parameter pdsch-Start belongs to {1,2,3,4}, $l'_{EPDCCHStat}$ is given by the higher layer parameter pdsch-Start, otherwise $l'_{EPDCCHStart}$ is given by the CFI value in subframe k of the given serving cell when $N_{RB}^{DL}>10$, and $l'_{EPDCCHStat}$ is given by the CFI value+1 in subframe k of the given serving cell when $N_{RB}^{DL} \leq 10$. In an example, in an initial partial subframe, the $l_{EPDCCHStart}$ for the ePDCCH may be offset by Offset_symbol OFDM symbols, e.g. by 7 symbols. If subframe k is indicated by the higher layer parameter mbsfn-SubframeConfigList, or if subframe k is subframe 1 or 6 for frame structure type 2, $l_{EPDCCHStart}=\min(2, l'_{EPDCCHStart})$, otherwise $l_{EPDCCHStart}=l'_{EPDCCHStart}$. In an example, in an initial partial subframe, the $l_{EPDCCHStart}$ for the ePDCCH may be offset by Offset_symbol OFDM symbols, e.g. by 7 symbols (Or equally the $l_{EPDCCHStart}$ may be applicable to the second slot.). In a full subframe, the $l_{EPDCCHStart}$ for the ePDCCH may be applicable to the first slot. The IE pdsch-Start may indicate the starting OFDM symbol of PDSCH for a cell. In an example, values 1, 2, 3 may be applicable when dl-Bandwidth for the concerned SCell is greater than 10 resource blocks, values 2, 3, 4 may be applicable when dl-Bandwidth for the concerned SCell is less than or equal to 10 resource blocks.

In an example embodiment a wireless device may receive control format indicator in a subframe. The wireless device may receive an enhanced physical downlink control channel (ePDCCH) signal in the subframe. The ePDCCH may start from an ePDCCH starting symbol determined based on the control format indicator, when the subframe is a full subframe. The ePDCCH starting symbol is calculated using CFI value and channel bandwidth. The ePDCCH starts from the starting symbol plus an offset value when the subframe is a partial subframe. For example, the ePDCCH starting symbol may be given by CFI value when $N_{RB}^{DL}>10$ in a full subframe. The ePDCCH starting symbol may be given by CFI value+offset_value when $N_{RB}^{DL}>10$ in a partial subframe. When the subframe is an MBSFN subframe, the minimum ePDCCH starting symbol may be 2 for a full subframe and 2+offset_value for a partial subframe.

In an example embodiment, a wireless device (e.g. operating in transmission mode 10) may receive at least one radio resource control (RRC) message comprising a field indicating a starting symbol for a physical downlink shared channel (PDSCH). The wireless device may receive an enhanced physical downlink control channel (ePDCCH) signal in a subframe. The ePDCCH may start from an ePDCCH starting symbol determined based on the starting symbol for the PDSCH, when the subframe is a full subframe. The ePDCCH may start from the ePDCCH starting symbol plus an offset value when the subframe is a partial subframe. For example, if the value of the parameter pdsch-Start-r11 belongs to {1,2,3,4}, ePDCCH starting symbol is given by the higher layer parameter pdsch-Start-r11 for a full subframe. If the value of the parameter pdsch-Start-r11 belongs to {1,2,3,4}, ePDCCH starting symbol is given by the higher layer parameter pdsch-Start-r11+Offset_value for a partial subframe. When the subframe is an MBSFN subframe, the minimum ePDCCH starting symbol may be 2 for a full subframe and 2+offset_value for a partial subframe.

If a serving cell is a LAA Scell, and if the parameter in RRC indicates subframe Start Position for a partial subrame may be 7 (Offset_symbol), for monitoring EPDCCH candidates starting in the first slot of the subframe, the starting OFDM symbol for EPDCCH is given by index $l_{EPDCCHStart}$ in the first slot in a subframe, and for monitoring EPDCCH candidates starting in the second slot of the subframe, the starting OFDM symbol for EPDCCH is given by index $l_{EPDCCHStart}$+Offset_symbol in a subframe (or equally $l_{EPDCCHStart}$ in the second slot in a subframe). The starting symbol is offset by Offset_symbol=7 in a partial subframe.

In an example, ePDCCH resource mapping (in ePDCCH RBs) may start from the ePDCCH starting symbol of the first slot for a full (regular) subframe of an LAA cell. In an example, in an initial partial subframe, the ePDCCH start symbol for the ePDCCH if configured, may be offset additionally by Offset_symbol OFDM symbols, e.g. by 7 symbols. In an example, ePDCCH resource mapping (in ePDCCH RBs) may start from the ePDCCH starting symbol of the second slot for a partial subframe of an LAA cell. In an initial partial subframe, the ePDCCH start symbol for the ePDCCH if configured, may be start at symbol Offset_symbol+the starting symbol of a subframe. In an example, the number of available resource elements for the EPDCCH may be an actual number of available REs for the EPDCCH transmission in the initial partial subframe.

The CFI takes values CFI=1, 2 or 3. For system bandwidths $N_{RB}^{DL}>10$, the span of the DCI carried by PDCCH in units of OFDM symbols, 1, 2 or 3, is given by the CFI (e.g. span 3 symbols include symbol numbers 0, 1, 2). For system bandwidths $N_{RB}^{DL} \leq 10$, the span of the DCI carried by PDCCH in units of OFDM symbols, 2, 3 or 4, is given by CFI+1.

For a given serving cell, if the UE is configured via higher layer signalling to receive PDSCH data transmissions according to transmission modes 1-9, and when StartSymbol IE is not configured, the starting symbol of ePDCCH may depend on CFI or other parameters.

In an example embodiment, in a full subframe, when CFI value is greater than zero, the starting OFDM symbol for EPDCCH given by index $l_{EPDCCHStart}$ in the first slot in a subframe is given by the CFI value in the subframe of the given serving cell when $N_{RB}^{DL}>10$, and $l_{EPDCCHStart}$ is given by the CFI value+1 in the subframe of the given serving cell when $N_{RB}^{DL} \leq 10$. This is for the case when ePDCCH is transmitted in the full subframe.

In an example embodiment, in a partial subframe, when CFI value is greater than zero, the starting OFDM symbol for EPDCCH given by index $l_{EPDCCHStart}$ in a subframe is given by the CFI+Offset_symbol value in the subframe of the given serving cell when $N_{RB}^{DL}>10$, and $l_{EPDCCHStat}$ is given by the CFI value+1+Offset_symbol in the subframe of the given serving cell when $N_{RB}^{DL} \leq 10$. This is for the case when ePDCCH is configured in the partial subframe.

In a serving cell, if subframe k is indicated as an MBSFN subframe (by PHY or RRC layer signaling), or if subframe k is subframe 1 or 6 for frame structure type 2, $l_{EPDCCHStart}$=min(2, $l'_{EPDCCHStart}$). ePDCCH starting position may not be smaller than 2.

In an example embodiment, in an LAA serving cell, if subframe k is indicated as an MBSFN subframe (by PHY or RRC layer signaling e.g. by the higher layer parameter mbsfn-SubframeConfigList-r11) $l_{EPDCCHStart}$= min(Offset_symbol+k, $l'_{EPDCCHStart}$), wherein k=1, or k=2. ePDCCH starting position may be Offset_symbol+1 or Offset_symbol+2. In an example, the first one or more symbols may be employed for transmission of physical signals, such as burst indicator, initial signal, or other physical layer signals carrying information about the subframe/burst configuration. When the starting symbol is Offset_symbol+1, the symbol Offset_symbol may be used for transmission physical at least one signal/channel.

In an example embodiment, in an LAA serving cell, if subframe k is subframe 1 or 6, $l_{EPDCCHStart}$=min(Offset_symbol+k, $l'_{EPDCCHStart}$), wherein k=1, or k=2. In an example UE implementation k may be 1. In another example UE implementation k may be 2. ePDCCH starting position may be Offset_symbol+1 or Offset_symbol+2 according to a UE implementation. The first one or more symbols may be employed for transmission of physical signals, such as burst indicator, initial signal, or other physical layer signals carrying information about the subframe/burst configuration.

In an example embodiment, a wireless device may receive at least one radio resource control (RRC) message comprising a field indicating a starting symbol for an enhanced physical downlink control channel (ePDCCH). The wireless device may receive ePDCCH signal in a subframe. The ePDCCH may start from the starting symbol when the subframe is a full subframe. The ePDCCH may start from the starting symbol plus an offset value when the subframe is a partial subframe.

A base station may transmit at least one radio resource control (RRC) message comprising a field indicating a starting symbol for an enhanced physical downlink control channel (ePDCCH). The base station may transmit ePDCCH signal in a subframe. The ePDCCH may start from the starting symbol when the subframe is a full subframe. The ePDCCH may start from the starting symbol plus an offset value when the subframe is a partial subframe.

The at least one RRC message may further comprise configuration parameters of a cell. The cell may be a licensed assisted access (LAA) cell. The at least one RRC message may further comprise configuration parameters comprising one or more parameters indicating resource blocks (RBs) for the ePDCCH. The at least one or more parameters indicate one or two sets of RB pairs. The field indicating the starting symbol may be applicable to the one or two sets of RB pairs. The at least one or more parameters may comprise a first parameter indicating a number of RB pairs; and a second parameter indicating an index identifying RB assignment. The at least one RRC message may further comprise at least one second parameter indicating a subframe pattern comprising one or more subframes, the one or more subframes comprising the subframe. The wireless device may receive from the base station one or more downlink transport blocks in a PDSCH employing a downlink grant received in the ePDCCH.

The at least one RRC message may further comprise a parameter indicating one or more possible starting positions of transmission in the subframe, the parameter being employed by the wireless device to determine the offset value. In an example, the offset value is seven. The partial subframe may start from a symbol indicated by the offset value. A subframe may comprise two slots in time. A slot comprises a plurality of symbols.

The wireless device may detect whether the subframe is the full subframe or the partial subframe. The wireless device may receive a physical downlink shared channel (PDSCH) in the subframe. The starting symbol may be further employed for determining a PDSCH starting symbol in the subframe. The PDSCH may start from the starting symbol when the subframe is the full subframe. The PDSCH may start from the starting symbol plus the offset value when the subframe is the partial subframe.

In an example emboidment, MBSFN may be configured employing one or more RRC messages. IE mbsfn-SubframeConfigList-r11 may comprise subframeConfigList:MBSFN-SubframeConfigList.

In an example, MBSFN-SubframeConfigList may be SEQUENCE (SIZE (1 . . . maxMBSFN-Allocations)) OF MBSFN-SubframeConfig. The IE MBSFN-SubframeConfig may define subframes that are reserved for MBSFN in downlink. For example, IE MBSFN-SubframeConfig may be SEQUENCE {radioframeAllocationPeriod: ENUMERATED {n1, n2, n4, n8, n16, n32}, radioframeAllocationOffset: INTEGER (0 . . . 7), subframeAllocation: CHOICE {oneFrame: BIT STRING (SIZE(6)), fourFrames: BIT STRING(SIZE(24))}.

In an example, IE fourFrames may be a bit-map indicating MBSFN subframe allocation in four consecutive radio frames, "1" may denote that the corresponding subframe is allocated for MBSFN. The bitmap may be interpreted as follows: FDD: Starting from the first radioframe and from the first/leftmost bit in the bitmap, the allocation may apply to subframes #1, #2, #3, #6, #7, and #8 in the sequence of the four radio-frames. TDD: Starting from the first radioframe and from the first/leftmost bit in the bitmap, the allocation may apply to subframes #3, #4, #7, #8, and #9 in the sequence of the four radio-frames. The last four bits may not be used. Uplink subframes may not allocated unless the field eimta-MainConfig-r12 is configured.

In an example, IE oneFrame may may be a bit-map indicating MB SFN subframe allocation in one radio frame. "1" may denote that the corresponding subframe is allocated for MBSFN. The following mapping may apply: FDD: The first/leftmost bit defines the MBSFN allocation for subframe #1, the second bit for #2, third bit for #3, fourth bit for #6, fifth bit for #7, sixth bit for #8. TDD: The first/leftmost bit may define the allocation for subframe #3, the second bit for #4, third bit for #7,fourth bit for #8, fifth bit for #9. Uplink subframes may not be allocated unless the field eimta-MainConfig-r12 is configured. The last bit may not be used.

In an example, IE radioFrameAllocationPeriod, radioFrameAllocationOffset may be configured. Radio-frames that contain MBSFN subframes may occur when equation SFN mod radioFrameAllocationPeriod=radioFrameAllocationOffset is satisfied. Value n1 for radioframeAllocationPeriod may denote value 1, n2 may denote value 2, and so on. When fourFrames is used for subframeAllocation, the equation may define the first radio frame referred to in the description below. Values n1 and n2 may not be applicable when fourFrames is used.

In an example, IE subframeAllocation may define the subframes that are allocated for MBSFN within the radio frame allocation period defined by the radioFrameAllocationPeriod and the radioFrameAllocationOffset.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
receiving, by a wireless device, at least one radio resource control (RRC) message comprising a field indicating a starting symbol for an enhanced physical downlink control channel (ePDCCH); and
receiving, via an ePDCCH, a signal, wherein:
the ePDCCH starts from the starting symbol for a full subframe; and
based on the RRC message, the ePDCCH starts from the starting symbol plus a non-zero offset symbol value for a partial subframe.

2. The method of claim 1, wherein:
the at least one RRC message further comprises configuration parameters comprising one or more parameters indicating resource blocks (RBs) for the ePDCCH;
the one or more parameters indicate one or two sets of RB pairs; and
the field indicating the starting symbol applies to the one or two sets of RB pairs.

3. The method of claim 1, wherein the at least one RRC message comprises a parameter indicating one or more possible starting positions of transmission in a subframe, and further comprising determining, based on the parameter, the non-zero offset symbol value.

4. The method of claim 1, further comprising:
receiving a physical downlink shared channel (PDSCH);
determining, based on the starting symbol, a PDSCH starting symbol, wherein:
the PDSCH starts from the starting symbol for a full subframe; and
the PDSCH starts from the starting symbol plus the non-zero offset symbol value for a partial subframe.

5. The method of claim 1, further comprising determining, based on a reference signal, whether a subframe is a full subframe or a partial subframe.

6. The method of claim 1, wherein the at least one RRC message further comprises a parameter indicating an ePDCCH subframe pattern comprising one or more subframes.

7. A wireless device comprising:
one or more processors; and
memory storing instructions that, when executed by the one or more processors, cause the wireless device to:
receive at least one radio resource control (RRC) message comprising a field indicating a starting symbol for an enhanced physical downlink control channel (ePDCCH); and
receive, via the ePDCCH, a signal, wherein:
the ePDCCH starts from the starting symbol for a full subframe; and
based on the RRC message, the ePDCCH starts from the starting symbol plus a non-zero offset symbol value for a partial subframe.

8. The wireless device of claim 7, wherein:
the at least one RRC message further comprises configuration parameters comprising one or more parameters indicating resource blocks (RBs) for the ePDCCH;
the one or more parameters indicate one or two sets of RB pairs; and
the field indicating the starting symbol applies to the one or two sets of RB pairs.

9. The wireless device of claim 7, wherein:
the at least one RRC message comprises a parameter indicating one or more possible starting positions of transmission in a subframe; and
the instructions, when executed by the one or more processors, further cause the wireless device to determine the non-zero offset symbol value based on the parameter.

10. The wireless device of claim 7, wherein the instructions, when executed, further cause the wireless device to:
receive a physical downlink shared channel (PDSCH); and
determine a PDSCH starting symbol based on the starting symbol, wherein:
the PDSCH starts from the starting symbol for a full subframe; and
the PDSCH starts from the starting symbol plus the non-zero offset symbol value for a partial subframe.

11. The wireless device of claim 7, wherein the instructions, when executed, further cause the wireless device to detect, based on a reference signal, whether a subframe is a full subframe or a partial subframe.

12. The wireless device of claim 7, wherein the at least one RRC message further comprises a parameter indicating an ePDCCH subframe pattern comprising one or more subframes.

13. A method comprising:
transmitting, by a base station, at least one radio resource control (RRC) message comprising a field indicating a starting symbol for an enhanced physical downlink control channel (ePDCCH); and
transmitting, by the base stationer and via the ePDCCH a signal, wherein:
the ePDCCH starts from the starting symbol for a full subframe; and
based on the RRC message, the ePDCCH starts from the starting symbol plus a non-zero offset symbol value for a partial subframe.

14. The method of claim 13, wherein:
the at least one RRC message further comprises configuration parameters comprising one or more parameters indicating resource blocks (RBs) for the ePDCCH;
the one or more parameters indicate one or two sets of RB pairs; and
the field indicating the starting symbol applies to the one or two sets of RB pairs.

15. The method of claim 13, wherein the at least one RRC message comprises a parameter indicating one or more possible starting positions of transmission in a subframe and for determining the non-zero offset symbol value.

16. The method of claim 13, further comprising transmitting, by the base station, a physical downlink shared channel (PDSCH), wherein:
the starting symbol is for determining a PDSCH starting symbol;

the PDSCH starts from the starting symbol for a full subframe; and the PDSCH starts from the starting symbol plus the non-zero offset symbol value for a partial subframe.

17. The method of claim 13, wherein the at least one RRC message further comprises a parameter indicating an ePDCCH subframe pattern comprising one or more subframes.

18. A base station comprising:
one or more processors; and
memory storing instructions that, when executed by the one or more processors, cause the base station to:
  transmit at least one radio resource control (RRC) message comprising a field indicating a starting symbol for an enhanced physical downlink control channel (ePDCCH); and
  transmit, via the ePDCCH, a signal, wherein:
    the ePDCCH starts from the starting symbol for a full subframe; and
    based on the RRC message, the ePDCCH starts from the starting symbol plus a non-zero offset symbol value for a partial subframe.

19. The base station of claim 18, wherein:
the at least one RRC message further comprises configuration parameters comprising one or more parameters indicating resource blocks (RBs) for the ePDCCH;
the one or more parameters indicate one or two sets of RB pairs; and
the field indicating the starting symbol applies to the one or two sets of RB pairs.

20. The base station of claim 18, wherein the at least one RRC message comprises a parameter indicating one or more possible starting positions of transmission in a subframe and for determining the non-zero offset symbol value.

21. The base station of claim 18, wherein the instructions, when executed, further cause the base station to transmit a physical downlink shared channel (PDSCH), wherein:
the starting symbol is usable to determine a PDSCH starting symbol;
the PDSCH starts from the starting symbol for a full subframe; and
the PDSCH starts from the starting symbol plus the non-zero offset symbol value for a partial subframe.

22. The base station of claim 18, wherein the at least one RRC message further comprises a parameter indicating an ePDCCH subframe pattern comprising one or more subframes.

23. A system comprising:
a base station; and
a wireless device,
wherein the base station is configured to:
  transmit at least one radio resource control (RRC) message comprising a field indicating a starting symbol for an enhanced physical downlink control channel (ePDCCH); and
wherein the wireless device is configured to:
  receive the at least one RRC message; and
  receive, based on the field indicating the starting symbol and via the ePDCCH a signal, wherein:
    the ePDCCH starts from the starting symbol for a full subframe; and
    based on the RRC message, the ePDCCH starts from the starting symbol plus a non-zero offset symbol value for a partial subframe.

24. The system of claim 23, wherein:
the at least one RRC message further comprises configuration parameters comprising one or more parameters indicating resource blocks (RBs) for the ePDCCH;
the one or more parameters indicate one or two sets of RB pairs; and
the field indicating the starting symbol applies to the one or two sets of RB pairs.

25. The system of claim 23, wherein:
the at least one RRC message comprises a parameter indicating one or more possible starting positions of transmission in a subframe; and
the wireless device is further configured to determine the non-zero offset symbol value based on the parameter.

26. The system of claim 23, wherein:
the base station is further configured to transmit a physical downlink shared channel (PDSCH);
the wireless device is further configured to determine a PDSCH starting symbol based on the starting symbol;
the PDSCH starts from the starting symbol for a full subframe; and
the PDSCH starts from the starting symbol plus the non-zero offset symbol value for a partial subframe.

27. The system of claim 23, wherein the wireless device is further configured to detect, based on a reference signal, whether a subframe is a full subframe or a partial subframe.

28. The system of claim 23, wherein the at least one RRC message further comprises a parameter indicating an ePDCCH subframe pattern comprising one or more subframes.

* * * * *

UNITED STATES PATENT AND TRADEMARK OFFICE
CERTIFICATE OF CORRECTION

PATENT NO. : 10,499,382 B2
APPLICATION NO. : 15/295977
DATED : December 3, 2019
INVENTOR(S) : Esmael Hejazi Dinan It is certified that error appears in the above-identified patent and that said Letters Patent is hereby corrected as shown below:

On the Title Page

In the List of References:

Item [56], Page 8, Column 1, Line 5:
Please delete "Tille" and insert --Title--

Item [56], Page 8, Column 1, Line 57:
Delete "Aclivation" and insert --Activation--

In the Specification

Column 2, Lines 15-16:
Delete "MAC media access control MAC media access control" and insert --MAC media access control--

Column 2, Lines 27-28:
Delete "PCell primary cell PCell primary cell" and insert --PCell primary cell--

Column 4, Line 17:
After "channel", insert --.--

Column 4, Line 29:
Delete "DFTS-OFDM-DM/SC-FDMA" and insert --DFTS-OFDM/SC-FDMA--

Column 4, Lines 32-33:
Delete "DFTS-OFDM-DM/SC-FDMA" and insert --DFTS-OFDM/SC-FDMA--

Column 10, Line 53:
After "demand", insert --.--

Signed and Sealed this
Twenty-fifth Day of October, 2022

Katherine Kelly Vidal
*Director of the United States Patent and Trademark Office*

CERTIFICATE OF CORRECTION (continued)
U.S. Pat. No. 10,499,382 B2

Column 11, Line 20:
After "transmission", insert --.--

Column 13, Line 36:
Delete "usec" and insert --μsec--

Column 13, Line 42:
Delete "us" and insert --μs--

Column 13, Line 53:
Delete "usec" and insert --μsec--

Column 13, Line 64:
Delete "us" and insert --μs--

Column 15, Line 67:
After "commands", insert --.--

Column 16, Line 13:
After "requirements", insert --.--

Column 16, Line 25:
After "ms)", insert --.--

Column 19, Line 43:
After "algorithm", insert --.--

Column 20, Lines 4-5:
Delete "EPDCCH-SetConfigld." and insert --EPDCCH-SetConfigId.--

Column 21, Line 33:
Delete "$I_{EPDCCHStat}$" and insert --$I_{EPDCCHStart}$--

Column 21, Line 35:
Delete "$I_{EPDCCHStat}$" and insert --$I_{EPDCCHStart}$--

Column 21, Line 37:
After "$N_{RB}^{DL}>10$", insert --,--

Column 21, Line 37:
Delete "$I_{EPDCCHStat}$" and insert --$I_{EPDCCHStart}$--

Column 21, Line 55:
Delete "$I'_{EPDCCHStart}=I'_{EPDCCHStart}.$" and insert --$I_{EPDCCHStart}=I'_{EPDCCHStart}.$--

CERTIFICATE OF CORRECTION (continued)
U.S. Pat. No. 10,499,382 B2

Column 22, Lines 57-58:
Delete "transmision" and insert --transmission--

Column 23, Line 22:
Delete "redcues" and insert --reduces--

Column 23, Lines 23-24:
Delete "emboidment" and insert --embodiment--

Column 23, Line 33:
Delete "subfarme" and insert --subframe--

Column 23, Line 33:
Delete "I'$_{EPDCCHStat}$" and insert --I$_{EPDCCHStart}$--

Column 23, Line 61:
Delete "I'$_{EPDCCHStat}$" and insert --I'$_{EPDCCHStart}$--

Column 24, Line 55:
Delete "subrame" and insert --subframe--

Column 25, Line 38:
Delete "I$_{EPDCCHStat}$" and insert --I$_{EPDCCHStart}$--

Column 26, Lines 1-2:
Delete "carriying" and insert --carrying--

Column 26, Line 57:
Delete "emboidment," and insert --embodiment--

Column 27, Line 19:
Delete "MB SFN" and insert --MBSFN--

Column 27, Line 26:
Delete "#7,fourth" and insert --#7, fourth--

In the Claims

Column 29, Line 24:
In Claim 1, delete "an" and insert --the--

Column 30, Line 44:
In Claim 13, delete "stationer" and insert --station--

Column 30, Line 44:
In Claim 13, after "ePDCCH", insert --,--

CERTIFICATE OF CORRECTION (continued)
U.S. Pat. No. 10,499,382 B2

Column 32, Line 12:
In Claim 23, after "ePDCCH", insert --,--